(12) United States Patent
Pan et al.

(10) Patent No.: US 12,108,448 B2
(45) Date of Patent: Oct. 1, 2024

(54) SS BLOCK METHODS AND PROCEDURES FOR NR-U

(71) Applicant: INTERDIGITAL PATENT HOLDINGS, INC., Wilmington, DE (US)

(72) Inventors: Kyle Jung-Lin Pan, Saint James, NY (US); Nirav B. Shah, San Diego, CA (US); Fengjun Xi, San Diego, CA (US); Chunxuan Ye, San Diego, CA (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 17/507,181

(22) Filed: Oct. 21, 2021

(65) Prior Publication Data

US 2022/0116998 A1     Apr. 14, 2022

Related U.S. Application Data

(63) Continuation of application No. 16/534,550, filed on Aug. 7, 2019, now abandoned.
(Continued)

(51) Int. Cl.
*H04W 74/0816* (2024.01)
*H04J 11/00* (2006.01)
(Continued)

(52) U.S. Cl.
CPC ..... *H04W 74/0816* (2013.01); *H04J 11/0069* (2013.01); *H04W 56/0045* (2013.01); *H04W 72/30* (2023.01)

(58) Field of Classification Search
None
See application file for complete search history.

(56) References Cited

U.S. PATENT DOCUMENTS 11,317,440 B2 *  4/2022  Kim ................. H04W 74/0816
2017/0251464 A1  8/2017  Mukherjee
(Continued)

FOREIGN PATENT DOCUMENTS

WO     2018/203708     11/2018

OTHER PUBLICATIONS

Interdigital Inc., "Considerations on Random Access for NR Unlicensed Spectrum," 3GPP TSG RAN WG1 Meeting 92, R1-1802648, Athens, Greece (Feb. 26-Mar. 2, 2018).
(Continued)

*Primary Examiner* — Saumit Shah
(74) *Attorney, Agent, or Firm* — Volpe Koenig

(57) ABSTRACT

Methods, systems, and apparatuses for use in wireless communication are disclosed. A method of communication on an unlicensed band may include detecting a Synchronization Signal/Physical Broadcast Channel (SS/PBCH) block comprising a demodulation references signal (DMRS), a synchronization signal (SS), and a PBCH payload. A SS/PBCH block index may be obtained from one of the DMRS and the PBCH payload. A cyclic rotation indicator may be obtained from the SS/PBCH block (e.g., from the DMRS, the SS, and/or the PBCH payload). A determination may be made that the cyclic rotation indicator indicates an on state and a time gap may be obtained from one of the DMRS and the PBCH payload, based on the determination. Frame timing may be determined based on the cyclic rotation indicator, the SS/PBCH block index, and the time gap.

14 Claims, 27 Drawing Sheets

Related U.S. Application Data

(60) Provisional application No. 62/736,908, filed on Sep. 26, 2018, provisional application No. 62/715,967, filed on Aug. 8, 2018.

(51) Int. Cl.
*H04W 56/00* (2009.01)
*H04W 72/30* (2023.01)

(56) References Cited

U.S. PATENT DOCUMENTS

| | | | |
|---|---|---|---|
| 2017/0353257 | A1 | 12/2017 | Islam et al. |
| 2018/0123849 | A1 | 5/2018 | Si et al. |
| 2018/0324023 | A1 | 11/2018 | Zeng et al. |
| 2018/0324732 | A1* | 11/2018 | Park .................. H04L 27/2613 |
| 2019/0306820 | A1 | 10/2019 | Jiang et al. |
| 2019/0313449 | A1 | 10/2019 | Tsai et al. |
| 2020/0021407 | A1* | 1/2020 | Abdoli ................ H04L 5/0039 |
| 2020/0022185 | A1 | 1/2020 | Luo et al. |
| 2020/0053670 | A1 | 2/2020 | Jung et al. |
| 2020/0280418 | A1* | 9/2020 | Gao ..................... H04L 5/0082 |
| 2021/0144660 | A1* | 5/2021 | Oh ....................... H04L 5/0048 |

OTHER PUBLICATIONS

Interdigital Inc., "Discussion on Procedures for Initial Access and Mobility in NR-U," 3GPP TSG RAN WG1 Meeting #95, R1-1813221, Spokane, USA (Nov. 12-16, 2018).

Interdigital Inc., "Initial Access and Mobility Procedures in NR-U," 3GPP TSG RAN WG1 Meeting #94bis, R1-1811205, Chengdu, China (Oct. 8-12, 2018).

Interdigital Inc., "Initial Access and Mobility Procedures in NR-U," Initial Access and Mobility Procedures in NR-U, R1-1900787, Taipei, Taiwan (Jan. 21-25, 2019).

Interdigital Inc., "On Initial Access and Mobility for NR-U," 3GPP TSG RAN WG1 Meeting #94, R1-1809090, Gothenburg, Sweden (Aug. 20-24, 2018).

Interdigital Inc., "On Initial Access for NR Unlicensed Spectrum," 3GPP TSG RAN WG1 Meeting #93, R1-1807037, Busan, South Korea (May 21-25, 2018).

Interdigital Inc., "On Random Access for NR Unlicensed Spectrum," 3GPP TSG RAN WG1 Meeting #92bis, R1-1804887, Sanya, China (Apr. 16-20, 2018).

International Telecommunication Union, "IMT Vision—Framework and overall objectives of the future development of IMT for 2020 and beyond; M Series Mobile, radio determination, amateur and related satellite services," Recommendation ITU-R M.2083-0 (Sep. 2015).

Third Generation Partnership Project, "Technical Specification Group Radio Access Network; NR; Physical layer procedures for control (Release 15)," 3GPP TS 38.213 V15.2.0 (Jun. 2018).

Third Generation Partnership Project, "Technical Specification Group Radio Access Network; NR; Physical layer procedures for control (Release 15)," 3GPP TS 38.213 V15.6.0 (Jun. 2019).

* cited by examiner

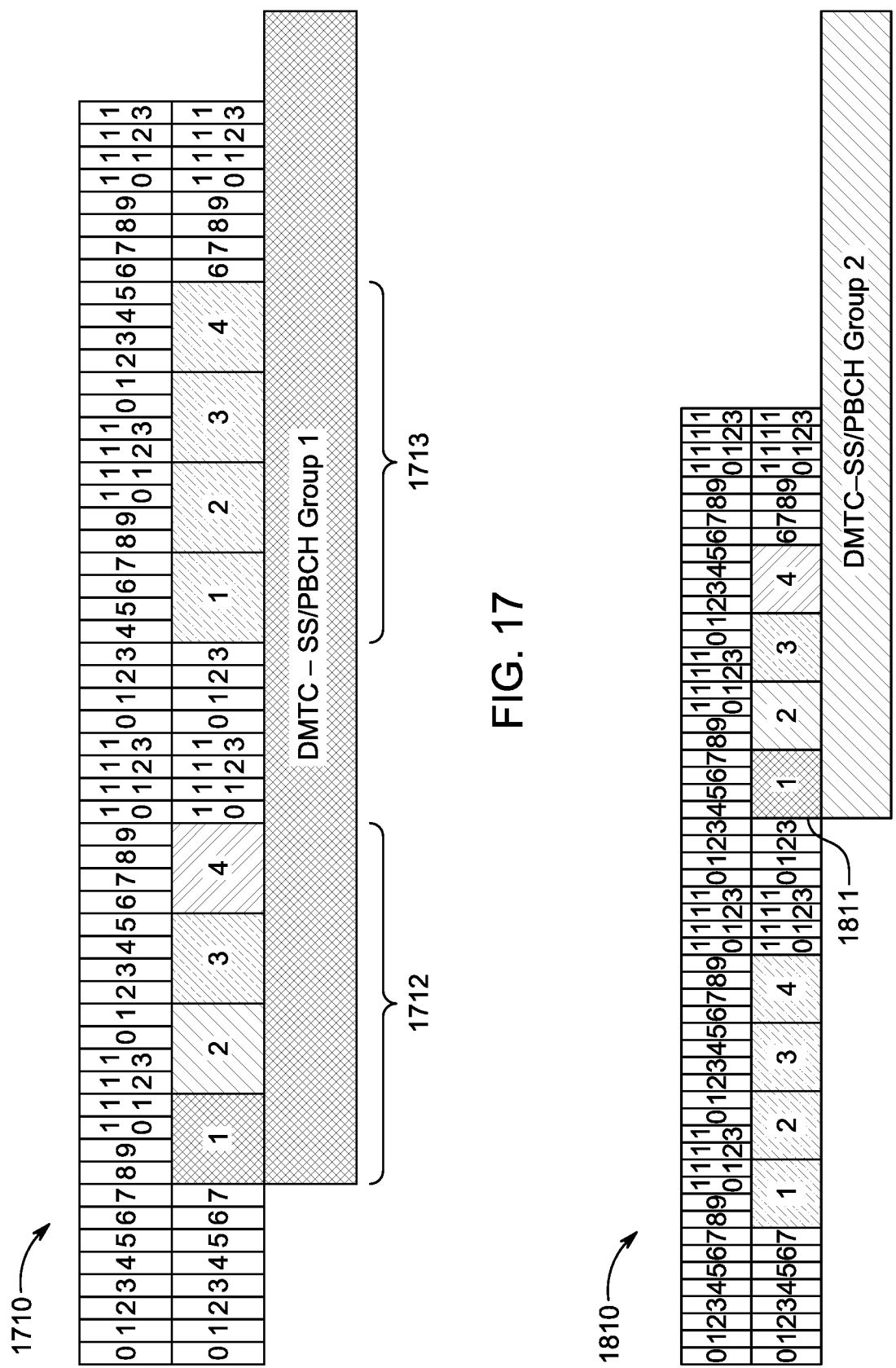

SS BLOCK METHODS AND PROCEDURES FOR NR-U

CROSS REFERENCE TO RELATED APPLICATIONS

This application is a continuation of U.S. patent application Ser. No. 16/534,550 filed Aug. 7, 2019, which claims the benefit of U.S. Provisional Application No. 62/715,967, filed Aug. 8, 2018 and U.S. Provisional Application No. 62/736,908, filed Sep. 26, 2018, the contents of which are incorporated herein by reference.

BACKGROUND

Use cases for emerging Fifth Generation (5G) wireless systems may include Enhanced Mobile Broadband (eMBB), Massive Machine Type Communications (mMTC) and Ultra Reliable and Low Latency Communications (URLLC). The different use cases may focus on different requirements, such as higher data rate, higher spectrum efficiency, low power and higher energy efficiency, lower latency, and higher reliability. A wide range of spectrum bands ranging from 700 MHz to 80 GHz may be used for a variety of deployment scenarios.

SUMMARY

Methods, systems, and apparatuses for use in wireless communication are disclosed. A method of communication on an unlicensed band may include detecting a Synchronization Signal/Physical Broadcast Channel (SS/PBCH) block comprising a demodulation references signal (DMRS), a synchronization signal (SS), and a PBCH payload. A SS/PBCH block index may be obtained from one of the DMRS and the PBCH payload. A cyclic rotation indicator may be obtained from the SS/PBCH block (e.g., from the DMRS, the SS, and/or the PBCH payload). A determination may be made that the cyclic rotation indicator indicates an on state and a time gap may be obtained from one of the DMRS and the PBCH payload, based on the determination. Frame timing may be determined based on the cyclic rotation indicator, the SS/PBCH block index, and the time gap. The frame timing may further be based on fixed time duration and/or may include determining an offset. The time gap may be an amount of time between a first rotated burst set and a second rotated burst set. The time gap may be determined based on a successful Listen before Talk (LBT) which may be preceded by a failed LBT. The SS/PBCH block may further include at least one of a Primary Synchronization Signal (PSS) and a Secondary Synchronization Signal (SSS). Acquiring the SS/PBCH block index may include acquiring the SS/PBCH block index from both the DMRS and the PBCH payload. The cyclic rotation indicator may include a one bit indication and/or a two bit indication. A portion of the SS/PBCH block may be cyclically wrapping based on the cyclic rotation indicator.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 17. shows examples of System Frame Number (SFN) based activation for SS/PBCH groups;

FIG. 18 shows examples of System Frame Number (SFN) based activation for SS/PBCH groups;

FIG. 34B shows an SSB after an unsuccessful LBT with cycle rotation on;

DETAILED DESCRIPTION

Figure 1A:
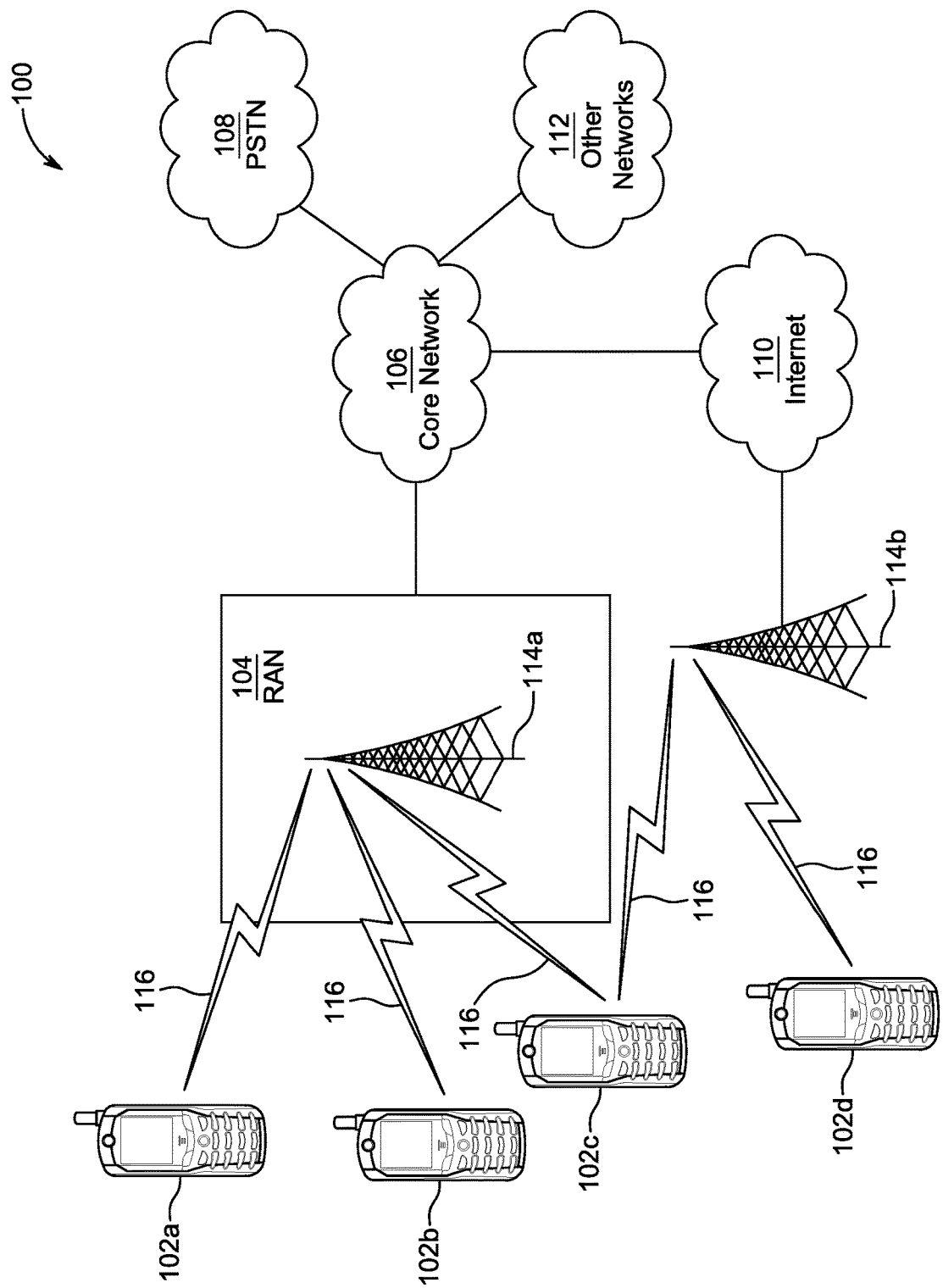
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
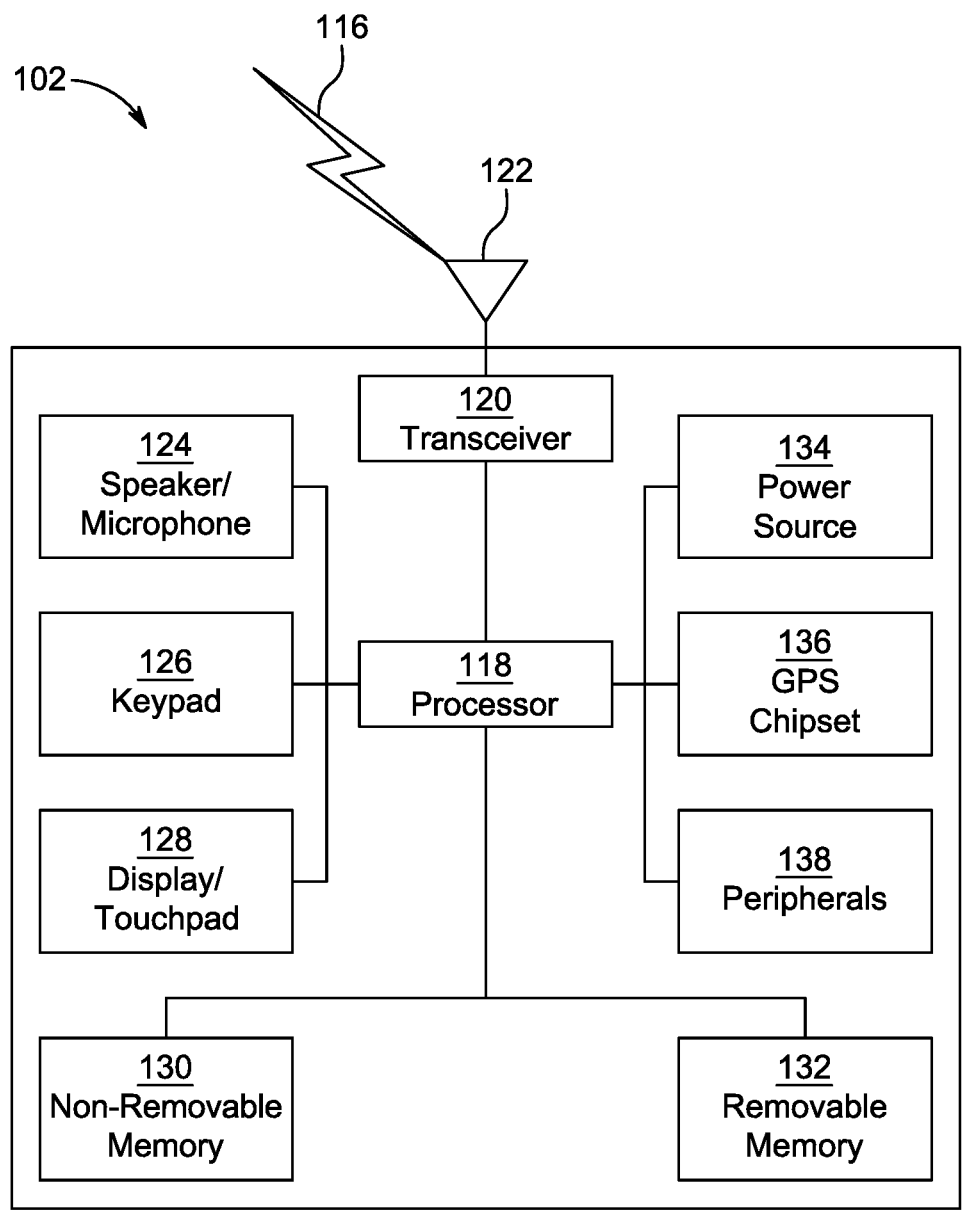
FIG. 1B is a system diagram illustrating an example wireless transmit/receive unit (WTRU) that may be used within the communications system illustrated in FIG. 1A according to an embodiment.
Figure 1C:
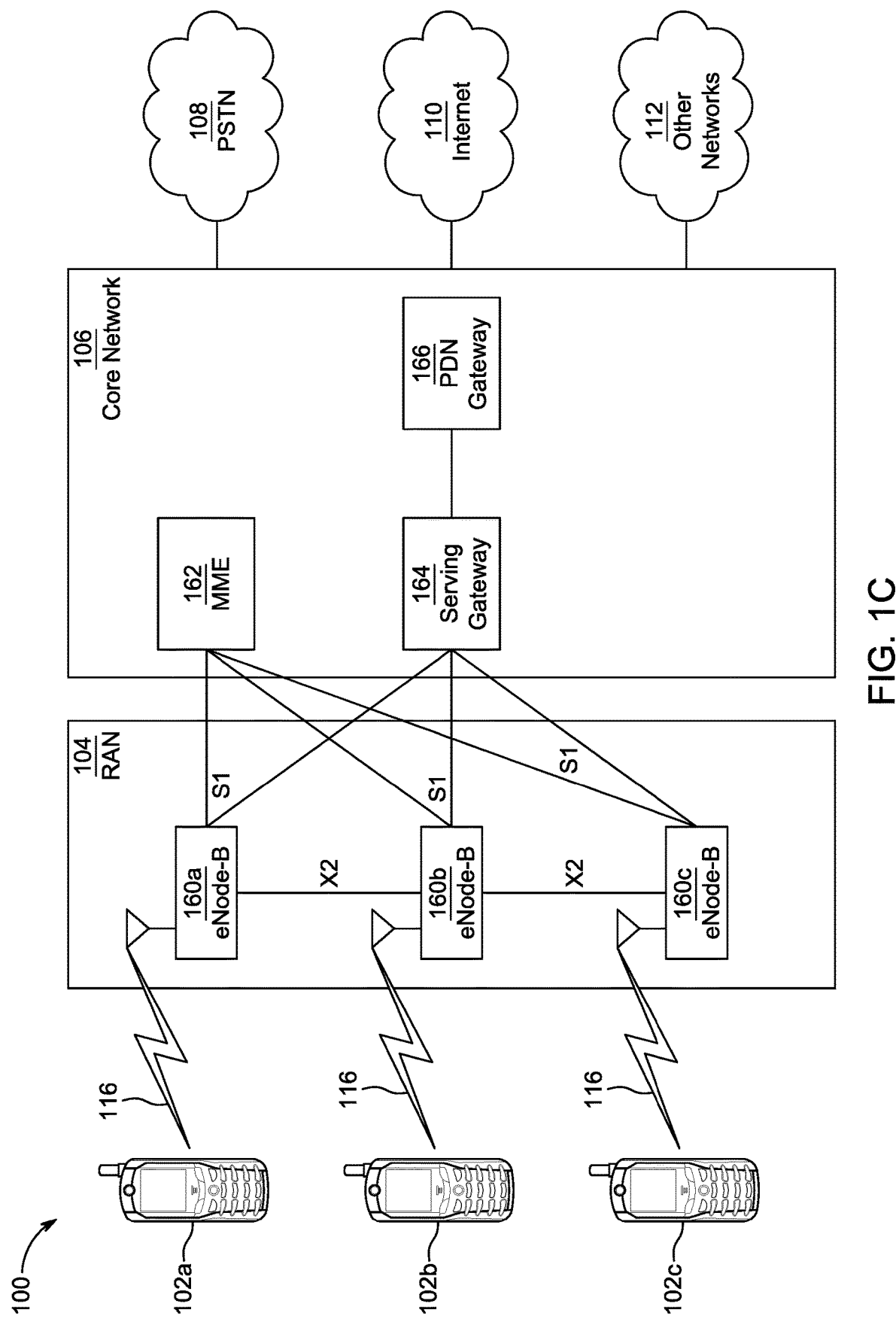
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 10:
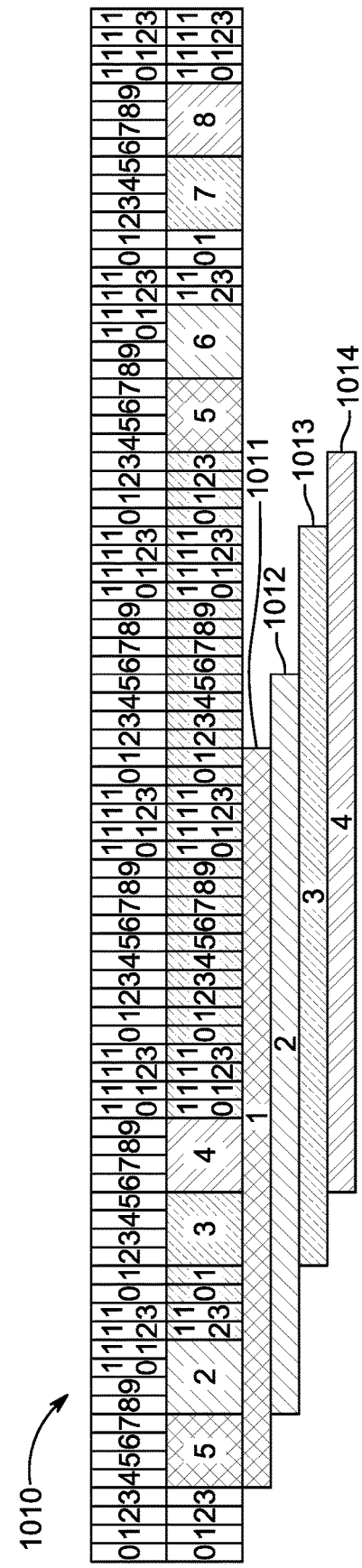
FIG. 10 shows examples of SCS dependent SS blocks.
Figure 11:
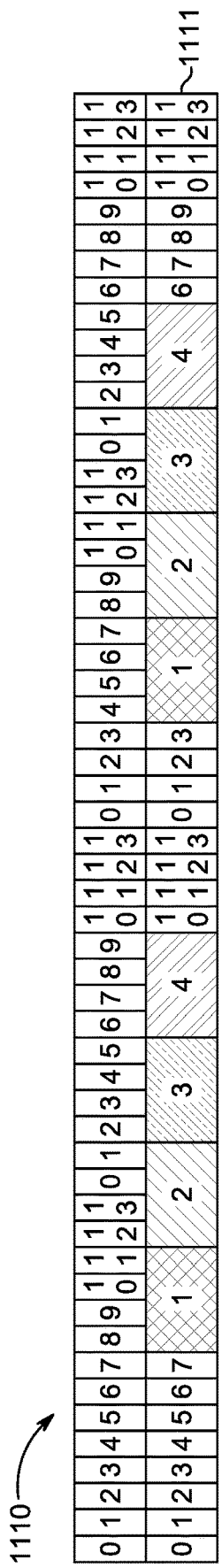
FIG. 11 shows examples of numerology dependent DRS measurement timing configuration (DMTC)/SS blocks.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
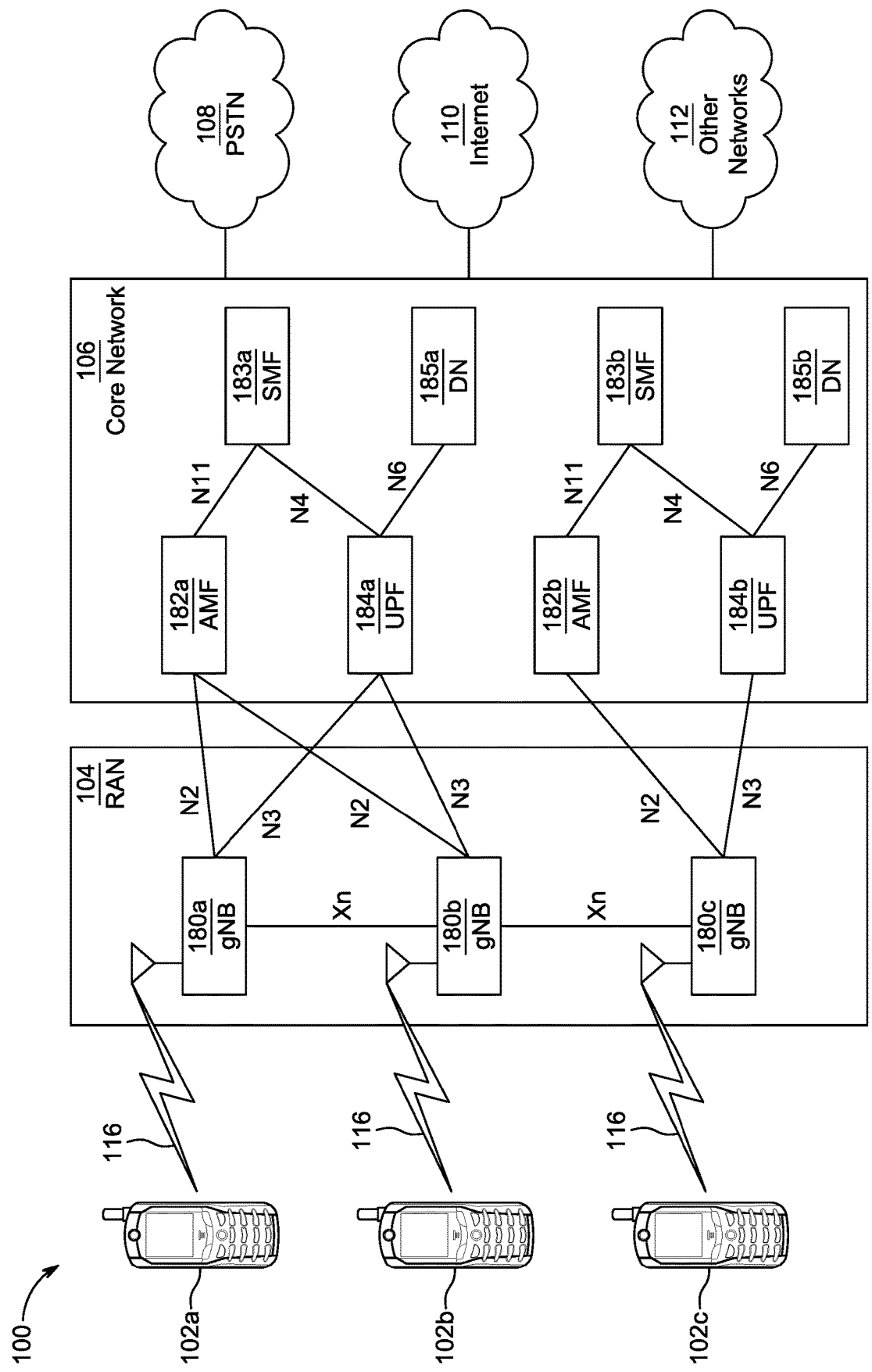
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

As carrier frequency increases, path loss may become severe and may be a crucial limitation to guarantee the sufficient coverage area. Transmission in millimeter wave systems may also suffer from non-line-of-sight losses (e.g., diffraction loss, penetration loss, oxygen absorption loss, foliage loss, etc.). During initial access, a base station and a WTRU may need to overcome these high path losses to discover one another. Utilizing dozens or even hundreds of antenna elements to generate a beam formed signal may be an effective way to compensate the severe path loss by providing significant beam forming gain. Beamforming techniques may include digital, analogue, and hybrid beamforming.

During a cell search procedure, a WTRU may acquire time and frequency synchronization with a cell and may detect the Cell ID of that cell. Synchronization signals (SS) may be transmitted in the 0th and 5th subframes of a radio frame and may be used for time and frequency synchronization during initialization. As part of the system acquisition process, a WTRU may synchronize sequentially to the OFDM symbol, slot, subframe, half-frame, and radio frame based on the synchronization signals. A Primary Synchronization Signal (PSS) may be used to obtain slot, subframe, and half-frame boundary. It may also provide physical layer cell identity (PCI) within the cell identity group. A Secondary Synchronization Signal (SSS) may be used to obtain the radio frame boundary. It may also enable the WTRU to determine the cell identity group, which may range from 0 to 167.

Following a successful synchronization and PCI acquisition, the WTRU may decode the Physical Broadcast Channel (PBCH) using a Cell Specific Reference Signal (CRS) and may acquire the Master Information Block (MIB) information regarding system bandwidth, System Frame Number (SFN), and PHICH configuration. The synchronization signals and PBCH may be transmitted continuously according to a standardized periodicity.

Paging may be used for network-initiated connection setup when the terminal is in RRC_IDLE (e.g., for LTE paging). The same mechanism used for downlink data transmission on the Downlink Shared Channel (DL-SCH) may be used. The WTRU may monitor the L1/L2 control signaling for downlink scheduling assignments related to paging. Since the location of the terminal typically may not be known on a cell level, the paging message may be transmitted across multiple cells in the so-called tracking area.

An efficient paging procedure may allow a terminal to sleep with no receiver processing most of the time and to briefly wake up at predefined time intervals to monitor paging information from the network. Therefore, a paging cycle may be defined, allowing the terminal to sleep most of the time and only briefly wake up to monitor the L1/L2 control signaling. If the terminal detects a group identity used for paging (e.g., scrambling the cyclic redundancy check (CRC) of the Downlink Control Information (DCI) using paging-RNTI (P-RNTI) represents paging indication) when it wakes up, it may process the corresponding downlink paging message transmitted on the PCH. The paging message may include the identity of the terminals being paged, and a terminal not finding its identity may discard the received information and sleep according to the Discontinuous Reception (DRX) cycle.

The network may configure during which subframes a terminal should wake up and listen for paging. The configuration may be cell specific, although it may be possible to complement the setting by terminal-specific configuration. The frame a given terminal should wake up and search for the P-RNTI on a PDCCH may be determined by an equation taking as an input the identity of the terminal as well as a cell-specific and, optionally, a terminal specific paging cycle. The paging cycle for a terminal may range from once per 256 frames up to once per 32 frames. The subframe within a frame to monitor for paging may also be derived from the International Mobile Subscriber Identity (IMSI), which is linked to subscription. As different terminals have different IMSI, they may compute different paging instances. Accordingly, from a network perspective, paging may be transmitted more often than once per 32 frames, although not all terminals may be paged at all paging occasions as they may be distributed across the possible paging instances.

Paging messages may be transmitted in some subframes, ranging from one subframe per 32 frames up to a very high paging capacity with paging in four subframes in every frame. From a network perspective, the cost of a short paging cycle may be minimal as resources not used for paging may be used for normal data transmission and are not wasted. However, from a WTRU perspective, a short paging cycle increases the power consumption as the terminal wakes up frequently, to monitor the paging instants.

In addition to initiating connection to terminals being in RRC_IDLE, paging may also be used to inform terminals in RRC_IDLE as well as RRC_CONNECTED about changes of system information or an emergency.

In unlicensed bands, a gNB or a WTRU may need to perform a listen-before-talk (LBT) procedure before accessing the unlicensed wireless channel. Depending on the regulatory requirements of the unlicensed channel, the LBT's specifics may be different. In general, a LBT procedure includes a fixed- and/or random-duration interval where a wireless node (e.g., a gNB or a WTRU) listens to a medium and if the energy level detected from the medium is more than a threshold (e.g., such as a threshold specified by the regulator) the gNB or WTRU may refrain from transmitting any wireless signal. Such an energy level above a threshold may indicate current use of the medium. Otherwise, the wireless node may transmit its desired signal after completion of the LBT procedure.

In some regulatory regimes, LBT procedures may be mandatory for unlicensed channel usage and, as a consequence, various LBT categories have been adopted. A LBT Category 4 (CAT 4) scheme, adopted in LAA/eLAA, may be the preferred scheme for most of the use cases. Other categories include 3GPP LAA (Release 13), eLAA (Release 14) and feLAA (Release 15). The LBT CAT 4 procedure may start when an eNB or gNB (and in some cases a WTRU) wants to transmit control or data in an unlicensed channel. The device may then conduct an initial clear channel assessment (CCA), wherein the channel is checked to determine if it has been idle for a period of time (e.g., a sum of a fixed period of time and a pseudo-random duration). The availability of the channel may be determined by comparing the level of energy detected (ED) across the bandwidth of the unlicensed channel to an energy threshold that is, for example, determined by the regulator.

If the channel is determined to be free, the transmission may proceed. If not, the device conducts a slotted random back-off procedure and a random number is selected from a specified interval called the contention window. A back-off countdown is obtained and the channel is verified if idle or not. The transmission may be initiated when the back-off counter goes to zero. After the eNB or gNB has gained access to the channel, it may be allowed to transmit for a limited duration referred to as the maximum channel occupancy time (MCOT). The CAT 4 LBT procedure with random back off and variable contention window sizes may enable fair channel access and good coexistence with other Radio Access Technologies (RATs), such as Wi-Fi and other LAA networks. An LBT procedure may be referred to herein simply as an LBT.

In licensed assisted non-standalone access, an unlicensed band operation may rely on the assistance of a primary component carrier in licensed band. In New Radio-Unlicensed (NR-U) standalone operation, all functionalities and features may be fulfilled on unlicensed bands, including initial access. Initial access may be essential for standalone operation. Due to spectrum characteristics and regulatory requirements (e.g., uncertainty of channel availability, the Occupied Channel Bandwidth (OCB) requirement, etc.), designs are provided herein to enable initial access in licensed band to be compatible with unlicensed band operation. In some unlicensed bands (e.g., 5 GHz), there may be transmission Power Spectral Density (PSD) limitations. Power boosting of synchronization signal may not be possible in unlicensed because of this PSD requirement and hence resulting in poorer synchronization performance.

For synchronization signals and NR-PBCH, Synchronization Signal (SS) blocks may be present consecutively per SS burst set for NR licensed band operation. The maximum transmission bandwidths of SS blocks may be 5, 10, 40 and 80 MHz with 15, 30, 120 and 240 KHz subcarrier spacing. Due to LBT failure, the SS block locations within a slot may not be optimum for NR unlicensed band operation. This may result in performance degradation of SS block detection. Uncertainty of channel availability may also have an impact on the SS burst configuration, such as the periodicity and time-window size of SS burst set. In addition, the OCB requirement may not be considered for transmission bandwidth of SS blocks, which may be required for NR-U. SS blocks to fulfil LBT and OCB requirement should be considered for NR-U.

A paging cycle may be defined to allow WTRUs to monitor paging message at a predefined time. For paging message transmission on unlicensed bands, the uncertainty of channel availability may cause the failure of paging DCI or paging message. As a result, WTRUs may not receive the corresponding paging message. Paging occasions may also be blocked due to LBT failure.

A discovery reference signal (DRS) may need to be integrated with beam-based NR-U. For a system with a high number of beams, efficient design may be needed. If transmitted without PDCCH/PDSCH, the DRS may occupy a very small BW. Other devices may sense the medium and may find the spectrum to be empty and transmit and this may result in failed DRS transmissions. Additionally, or alternatively, for a large number of beams (e.g., in a >6 GHz case), total DRS measurement timing configuration (DMTC) duration may prohibitively large. A listen before each DRS beam may be used. However, if there is interference, DRS for specific beam may be skipped and this may introduce additional delays.

LBT requirements may support single or multiple switching points, include gaps of 16 µS, 16-25 µS, and greater than 25 µS. Different LBT scheme may be used for different gaps. These gaps may use a Rach occasion or other Uplink transmissions which may exceed 25 µS. Benefits of using a signal that facilitates its detection with low complexity may be investigated for WTRU power saving. If the offset for floating DRS (in time) is included in the PBCH, the information content in PBCH may change every SS/PBCH block. Soft combining for PBCH intra SFN or inter-subframe may be difficult.

Two main requirements for unlicensed band are OCB requirements and PSD requirements. The following description may include SS/PBCH block solutions to meet regulatory requirements.

The OCB may be the bandwidth containing 99% of the power of the signal. Typically, OCB of a transmitted signal may be at least 80% (70% for 60 GHz bands) of the declared nominal channel bandwidth (NCB), which may be the widest band of frequencies, inclusive of guard bands, assigned to a single channel. NCB for a single operating channel may be 20 MHz, but a lower NCB of at least 5 MHz may be used by a WTRU.

One way to meet the OCB requirement may be to use higher subcarrier spacing with larger number of PRBs (e.g., 60 kHz and 24 PRBs for sub-7 GHz). For 60 kHz sub-carrier spacing (SCS), 20 PRB may occupy 14.4 MHz. This may be less than 80% of NCB. However, 24 PRB may occupy larger than 80% of nominal channel bandwidth. Another way to meet the OCB requirement may be to use FDM between SS/PBCH block and other signal/channel (e.g., CSI-RS/RMSI). This approach may be used when SS/PBCH and RMSI are present at the same time instance. Yet another approach may be to use multiple SS/PBCH blocks in frequency domain. This may require more resources.

Yet another approach may be a hybrid approach which combines the description above. For example, an approach may use multiple SS/PBCH blocks in frequency domain and/or higher subcarrier spacing with larger number of PRBs by default and use FDM between single SS/PBCH block and other signal/channel when RMSI, CSI-RS, paging, other signal/channel or the like are present.

Yet another approach may be to align the primary channel (20 MHz BWP) to a 20 MHz raster. Yet another approach may be a subcarrier spacing dependent PRB allocation for the SS/PBCH block (e.g., a p dependent PRB allocation for SS/PBCH block). For lower SCS, a higher number of PRBs may be used. A repetition of sequence or signal may also be used in frequency.

Yet another approach may be to use IFDMA/B-IFDMA for PSS/SSS and PBCH may be performed to increase the channel occupancy. The PHY approach may differ from the NR. Yet another approach may be to transmit SS blocks (SSBs) at 20 MHz raster. If SSBs are transmitted on 20 MHz raster for <5 GHz bands, OCB requirements may be lower and may be met with existing NR SS/PBCH blocks. However, this may restrict zero-guard band transmission like NR, where multiple BWPs may be transmitted using the same FFT.

Limits on the transmit power and PSD may be imposed. For example, for a frequency range of 5150 MHz to 5350 MHz with transmit power control, the maximum transmitted power may be limited to 23 dBm with a maximum PSD of 10 dBm/MHz. Transmission power may be further limited in the case of signal with small transmission bandwidth which may subsequently decrease the cell coverage. The minimum bandwidth of 20 MHz may be needed for all scenarios to reach the maximum power while satisfying the maximum PSD. Conventional NR-PSS/NR-SSS may occupy 7.62 MHz, 3.81 MHz and 1.91 MHz for SCS 60, 30 and 15 kHz respectively. NR-PBCH may occupy 14.4 MHz, 7.2 MHz and 3.6 MHz for SCS 60 kHz, 30 kHz, and 15 kHz correspondingly. In unlicensed band, the maximum PSD may be regulated at 10 dBm/MHz. Hence with SCS 60 kHz, 30 kHz, and 15 kHz, PSS/SSS may have maximum transmit power at 18.81 dBm, 15.81 dBm, and 12.81 dBm.

A long SS block may be used. A long SS block may employ long PSS and/or SSS sequences. A long M sequence for PSS and a long Gold Sequence for SSS may be used. For example, a long sequence length 255 may be used to occupy all 24 RB. This may include some guard band. An M sequence for PSS may be interlaced with null tone in frequency domains. This may be transmitted on every other sub-carrier. This may create a time repeated structure to satisfy PSD/OCB requirement without sacrificing performance. A Gold sequence for SSS may be interlaced with null tone in frequency domains. This may be transmitted on every other sub-carrier. This may create time repeated structure to satisfy PSD/OCB requirement.

OCC may be applied on the repeated copies of PSS and SSS in time or frequency. An X-bit indication may be used to indicate whether the interlace structure is used for PBCH. Such indication may use OCC applied on the repeated copies of PSS and SSS in time or frequency.

The type of SS block format to be used may be configured, indicated, or predefined. The SS/PBCH block may be designed to occupy more BW. This may increase number of SCs. Higher sub-carrier spacing between sub-carrier may also be used. To meet OCB and PSD requirements and still achieve synchronization performance, a synchronization signal (e.g., PSS and/or SSS) may occupy larger a bandwidth. This may be configured, indicated, or predefined.

Figure 2:
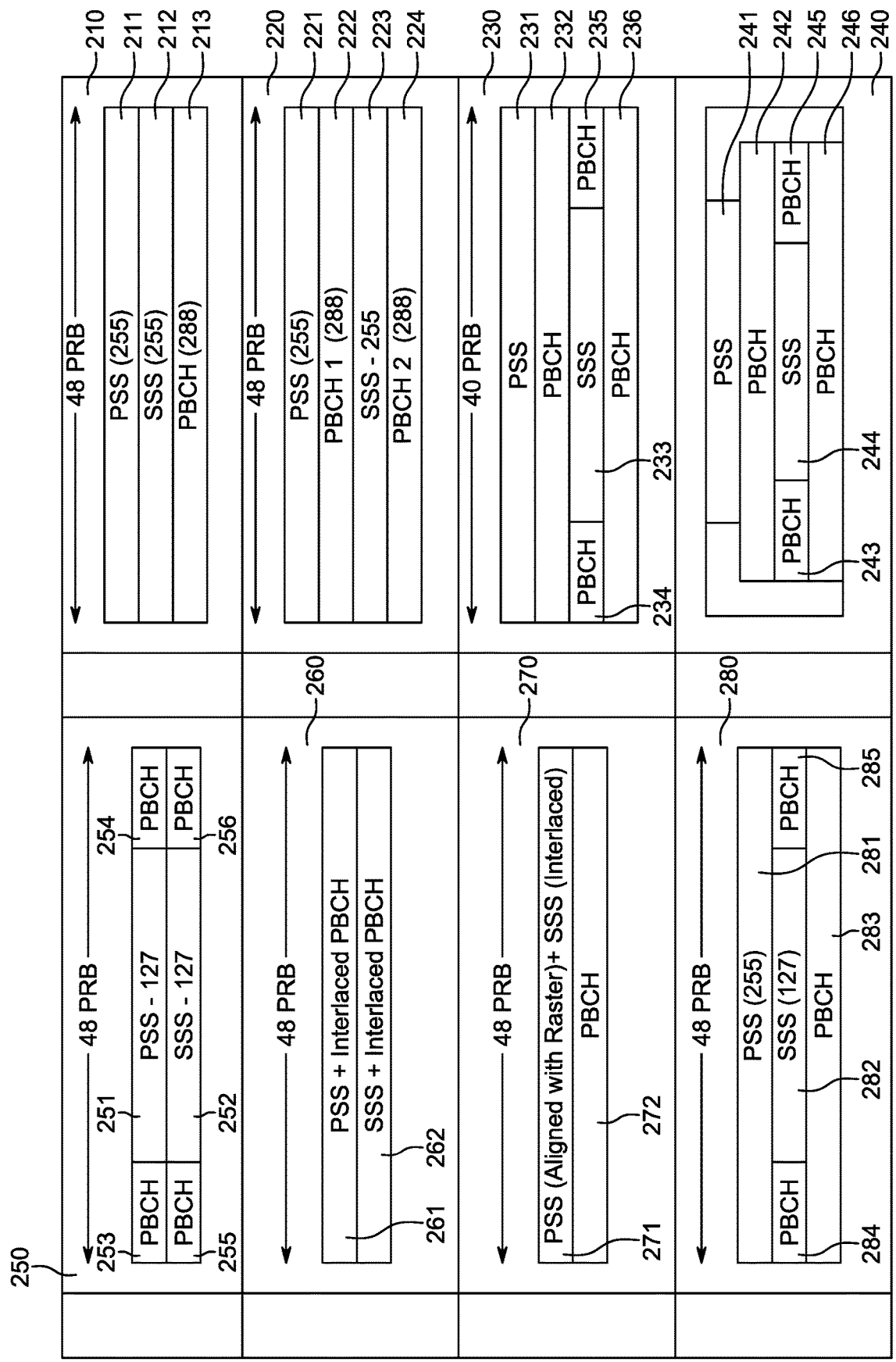
FIG. 2 shows examples of synchronization signal (SS) blocks.

Referring now to FIG. 2, a diagram illustrating options for SS Blocks to be used in NR-U is shown. If a 30 kHz SCS is considered for NR-U SS/PBCH block, it may occupy up to 48 RBs in a 20 MHz BW. A long SS block format and/or long sequence for PSS 211 and/or SSS 212 with PBCH 213 may be used as shown at option 210. This may be used in combination with an interlaced SS block occupying larger bandwidth as shown at option 220 with PSS 221, PBCH 1 222, SSS 223 and PBCH 2 224. A long sequence for PSS 231 and/or SSS 233 or an interlaced SS block such as PBCH 232, 234, 235, and/or 236, may be used with different numbers of PRBs as shown at option 230. For example, the number of PRBs may be doubled in frequency. The PSS 241, SSS 244, and PBCH 242, 243, 245 and/or 246 may have the same or different PRBs, as shown at 240. The PSS 241, SSS 244, and PBCH 242, 243, 245 and/or 246 may have the same or different interlaced structures. The PSS 251, SSS 252, and PBCH 253, 254, 255, and/or 256 may or may not have interlaced structures as shown at option 250. The PSS may be interlaced with the PBCH in a first symbol 261, the SSS may be interlaced with the PBCH in a second symbol 262, as shown at option 260. The PSS and the SSS may be interlaced with each other at 271, wherein the PSS falls on the 20 MHz raster which may be detected independently in advance, as shown at option 270 with PBCH 272. A long sequence for the PSS 281 and/or the PBCH 284 and/or 285 multiplexed with the SSS 282 in the second symbol and only the PBCH 283 in third symbol may be used, as shown at option 280. These approaches may increase the bandwidth occupied by the synchronization signals and/or symbols for OCB requirements.

Figure 3:
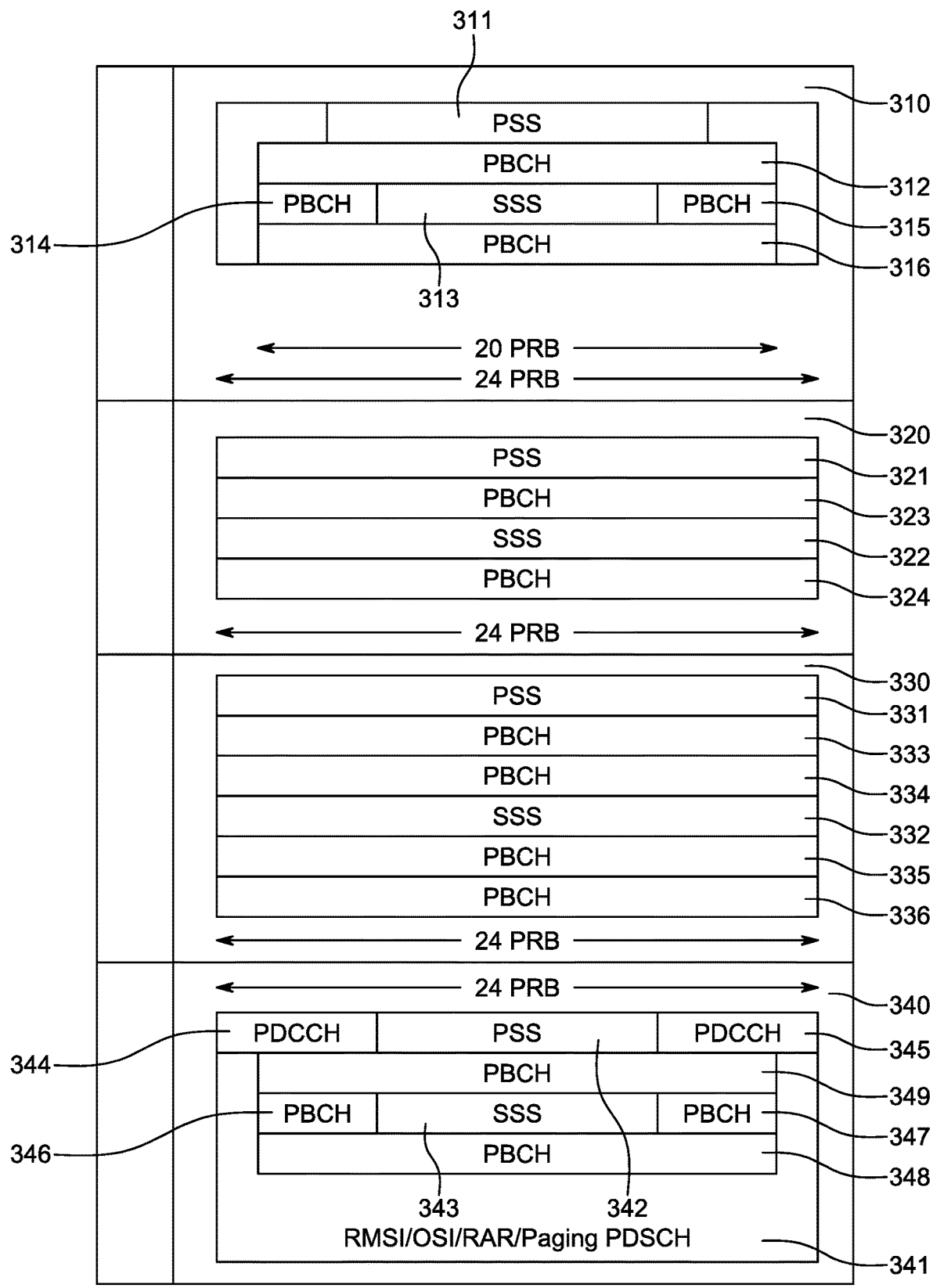
FIG. 3 shows examples of SS blocks.

Referring now to FIG. 3, a diagram illustrating more options for SS Blocks to be used in NR-U is shown. If a 60 kHz SCS is considered for NR-U SS/PBCH block, it may occupy up to 24 RBs in a 20 MHz BW, as shown at option 310 which includes PSS 311, PBCH 312, SSS 313, PBCH 314, 315 and 316. The SSS/PBCH may be always centered at the 20 MHz raster. It may be possible to use long PSS format with long sequence to increase the occupied bandwidth as well as the transmitted power. It may be possible to increase the bandwidth using interlaced structure. Long format with long sequences for PSS and/or SSS, or interlaced structure for PSS 321 and/or SSS 322 may be used either individually or jointly as shown at 320 with PBCH 323 and/or 324. For example, PSS/SSS with 24 RBs and PBCH with 48 RBs may be used.

In another example, long format or long sequences for PSS 331 and/or SSS 332 with or without interlaced structure and long PBCH 333, 334, 335, and 336 with 96 RBs may be used, as shown at option 330. TDM or combination of FDM and TDM with other signals or channels such as RMSI, OSI, RAR, Paging, PDSCH, PDCCH or the like may be used. Mini-slot, non-slot with any number of OFDM symbols may be used for SS blocks. A single LBT may be performed to transmit SS/PBCH block and the subsequent DL data (or UL data) in the same beam.

An RMSI 341 may not be FDMed with the SS/PBCH block, as shown at option 340 which includes PSS 342, PDCCH 344 and 345, SSS 343, PBCH 346, 347, 348, and 349. The RMSI 341 (as well as OSI, RAR, and/or Paging PDSCH) may be scheduled separately in time. It may be subject to another LBT. The RMSI may be scheduled in the same slot and transmitted consecutively after SS/PBCH block. This may require the periodicities of SS/PBCH block and RMSI to be integer multiples of each other.

An interlace based resource allocation design may be used for an eLAA uplink waveform. This may allow an eNB to transmit at a higher power and span a wide bandwidth without occupying entire system bandwidth. The interlace structure may be applied to both UL and DL (especially in synchronization signals) to achieve better coverage and reduce interference by distributing power over REs. Using a PSD limit on the 5150-5250 MHz band as an example, the PSD limit may be 5150-5350 MHz with/without TPC: 10 dBm/MHz. As discussed above, under the PSD limit, if a gNB wants to transmit with 23 dBm, it may need to occupy the entire 20 MHz BW. The PSD may be capped at 10 dBm/MHz and the power per subcarrier may be capped at approximately −8.2 dBm. The 5250-5350 MHz band may have a requirement of 7 dBm/MHz without TPC.

An interlaced structure, such as interleaved frequency-division multiple access (IFDMA) may be employed for NR-U. A gNB may occupy a subcarrier every N sub-carriers for an SS signal or SS block. B-IFDMA may also be employed for SS block or PBCH. A gNB may occupy a fraction of an RB, a whole RB, or two RBs (e.g., <1 MHz) every N RBs over the wide channel PBCH symbol. A system may be divided into multiple orthogonal interlaces and may allow multiple nodes access with frequency domain multiplexing. In addition, the power per subcarrier may also be improved as the 10 dBm PSD limit may only be distributed over the fraction of bandwidth, which may be much smaller than 1 MHz. When the fraction of bandwidth is 1 RB with 15 KHz SCS, the power per subcarrier may be increased to 0.2 dBm, which may translate into 8 dB better coverage compared to the contiguous frequency transmission.

One or more of the following options may be used: IFDMA based SS/PBCH block (e.g., PSS/SSS/PBCH), B-IFDMA based SS/PBCH block, IFDMA for PSS/SSS and B-IFDMA for PBCH, B-IFDMA for PSS/SSS, and IFDMA for PBCH. The interlace selection may be cell ID dependent or may be a function of cell ID. For example, the interlace selection may be a function of NID2.

The IFDMA based SS/PBCH block (e.g., PSS/SSS/PBCH) design may increase the power that can be transmitted for PSS/SSS by using higher BW. It may also allow increasing frequency reuse. For example, for 30 kHz SCS, 48 RBs, and 576 sub-carriers may be used. Four interlaces may be used and one out of four may be used. Cell-id based selection may be possible. If the 576 sub-carriers are divided by 4, this may result in 144 sub-carriers, out of which 127 may be occupied. Actual SCS for PSS/SSS may become 30*4=120 kHz. One of them may fall on the 20 MHz raster. The other 3 may be off by 30/60 kHz. By doing so, there may be a time domain repeated structure of four repetitions of the PSS/SSS. Non-coherent detection for PBCH may be improved. For 60 kHz SCS, 24 RBs, and 288 sub-carriers may be used. Every other sub-carrier may be used. The effective SCS may be 120 kHz. By doing so, there may be an automatic repeated structure of two repetitions of the PSS/SSS.

Figure 4:
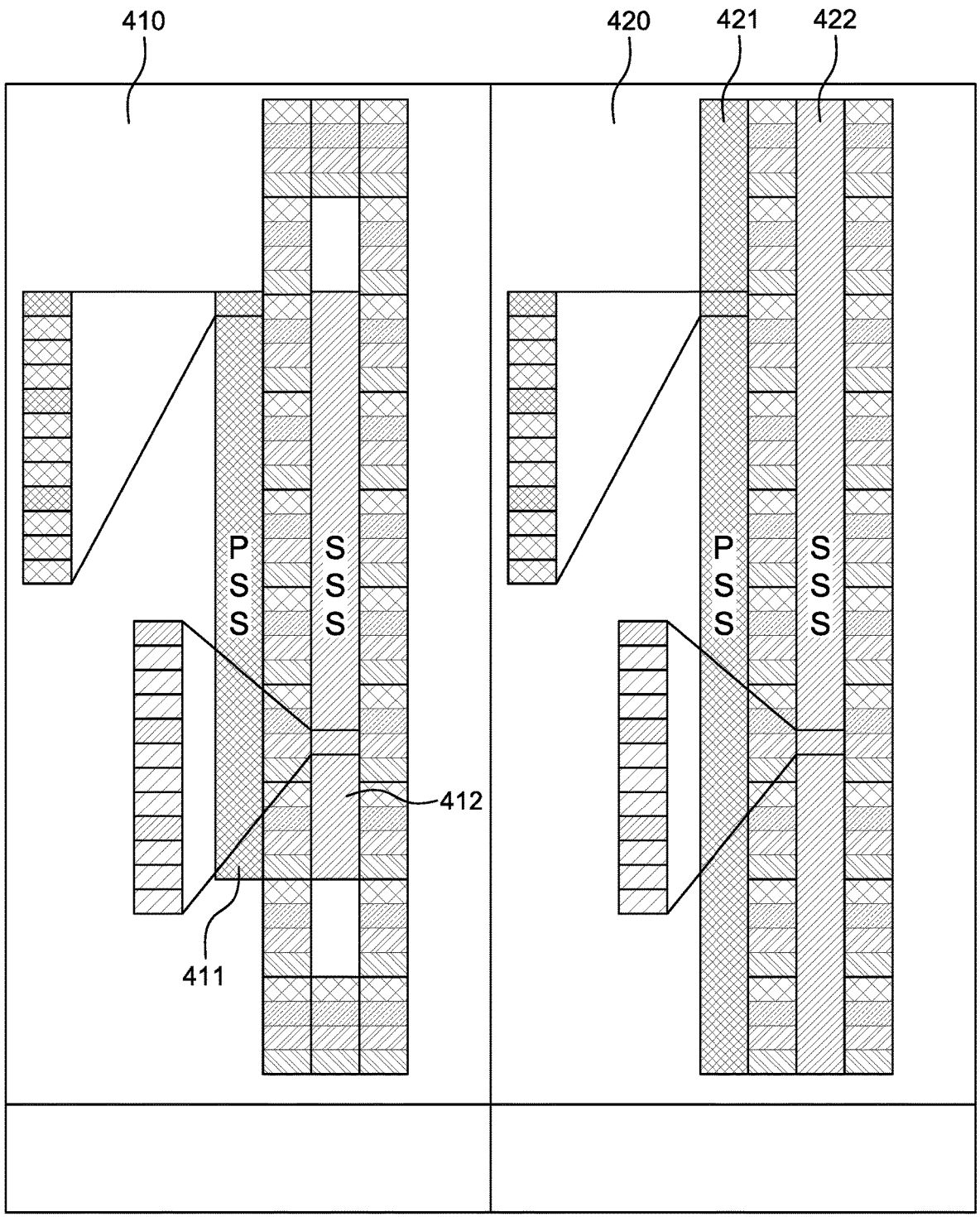
FIG. 4 shows examples of hybrid interlaced SS blocks.

Referring now to FIG. 4, a diagram illustrating examples of hybrid interlaced SS Block approaches for NR-U is shown. The dark diagonal and dark vertical sections may indicate that a sub-carrier is occupied and the light diagonal and light vertical sub-carriers may be zeroed out. Option 410 shows PSS 411 and SSS 412 occupying less than a maximum BW of 12 RBs, PBCH occupying 20 RBs in the 2nd and 4th symbol and occupying some RBs in 3rd symbol around SSS. Option 420 shows PSS 421 and SSS 422 occupying the full BW of 24 RBs, and PBCH occupying 24 PRBs times 2 OFDM symbols.

IFDMA with X potential interlaces (not Block level) that depends on cell ID may be used. For example, X=3 if it depends on NID2. Full subcarrier based interlace SCS-of-DRS=3×SCS or 4×SCS may be used. A WTRU may blind detect the shift. NR-U-PSS and NR-U-SSS may use the same interlace so that SSS may be able to use channel estimation from PSS to perform coherent detection for SSS.

Interlace of DRS and even DL data may increase reuse from other gNB or even other WTRU transmitting to other gNB. If a gNB observes high energy from its neighbor nodes it may be able to identify un-used interlace and may transmit without affecting the on-going transmission. If a WTRU observes high-energy from a neighboring gNB (i.e., one it is not associated with), it may be able to identify unused interlace and may transmit without affecting the on-going transmission.

A unified UL/DL interlaced design may increase reuse. To enable this, it may be possible to first transmit PSS/SSS in IFDMA followed by two symbols of NR-U-PBCH of B-IFDMA.

Figure 5:
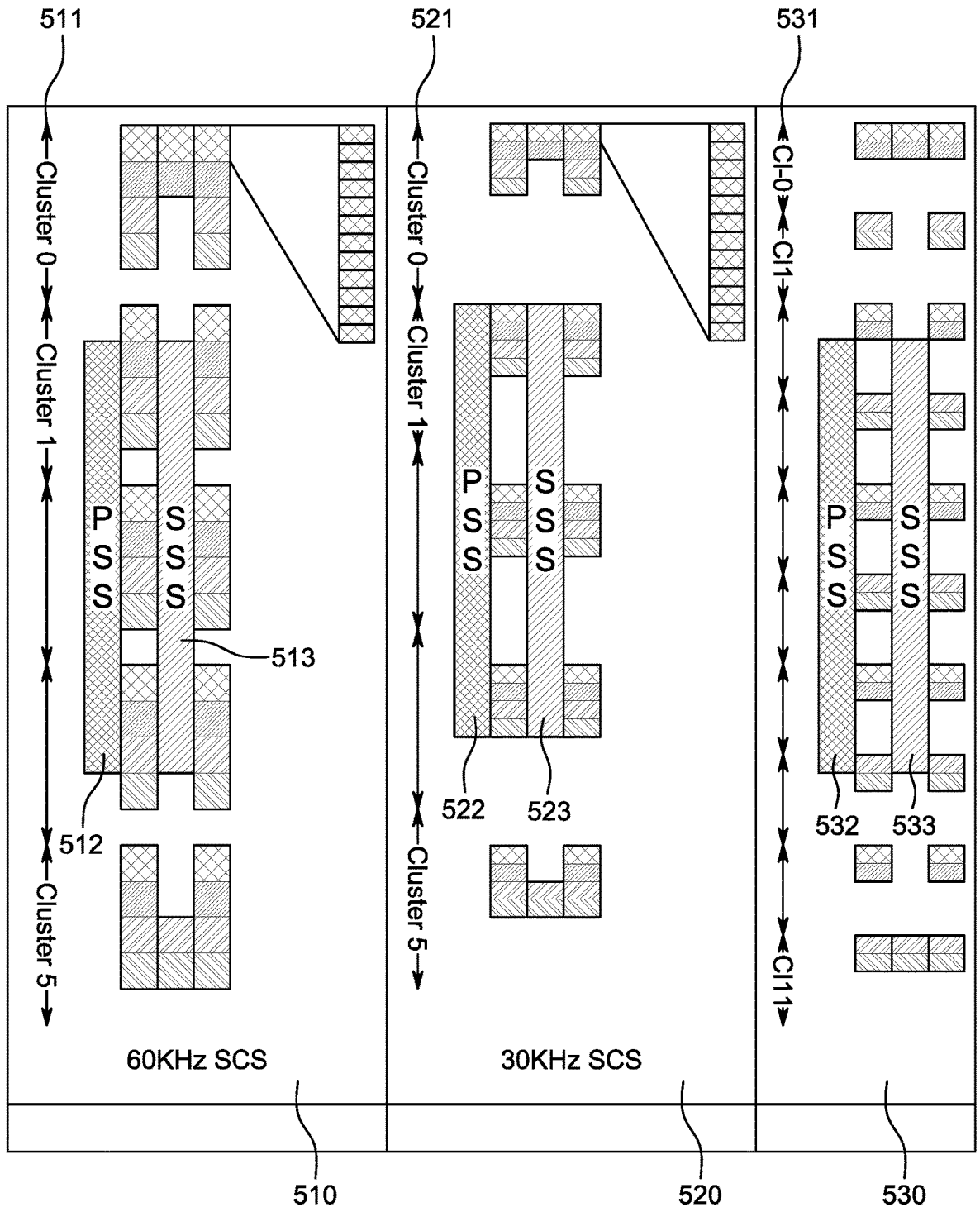
FIG. 5 shows examples of hybrid interlaced SS blocks.

Referring now to FIG. 5, a diagram illustrating more options for hybrid interlaced SS Block approaches for NR-U is shown. FIG. 5 shows examples of B-IFDMA-PBCH approaches.

To enable channel estimation within RB or a block of RBs, a block interlaced approach may be more suited for NR-U PBCH. Option 510 may include 60 kHz SCS, six clusters 511 four interlaces 24 PRB with PSS 512 and SSS 513. A gNB may use 2 interlace in each cluster. If 2 out of 4 interlaces are used, a WTRU may be able to blind detect that and may be able to derive one bit of information such as half-frame or a bit of SFN, or a bit of SSBI. If sub-RB clustering is used, 12 clusters with 4-6 sub-carrier interlaces may be used.

Option 520 may include 30 kHz SCS, six clusters 521, eight interlaces total with PSS 522 and SSS 523. Four of the interlaces may be used for transmission. As four out of eight interlaces are used, a WTRU may be able to blind detect that and may be able to derive one bit of information such as half-frame or a bit of SFN, or a bit of SSBI.

Option 530 may include 30 kHz SCS, twelve clusters 531, and four Interlaces total with PSS 532 and SSS 533. Two of the interlaces may be used for transmission. As two out of four interlaces of the cluster are used, a WTRU may be able to blind detect that and may be able to derive one bit of information such as half-frame or a bit of SFN, or a bit of SSBI. A detailed SCS based design may be described in detail below. In the examples below, without loss of generality, it may be possible to first transmit PSS/SSS followed by two or more symbols of NR-U-PBCH of B-IFDMA.

Figure 6:
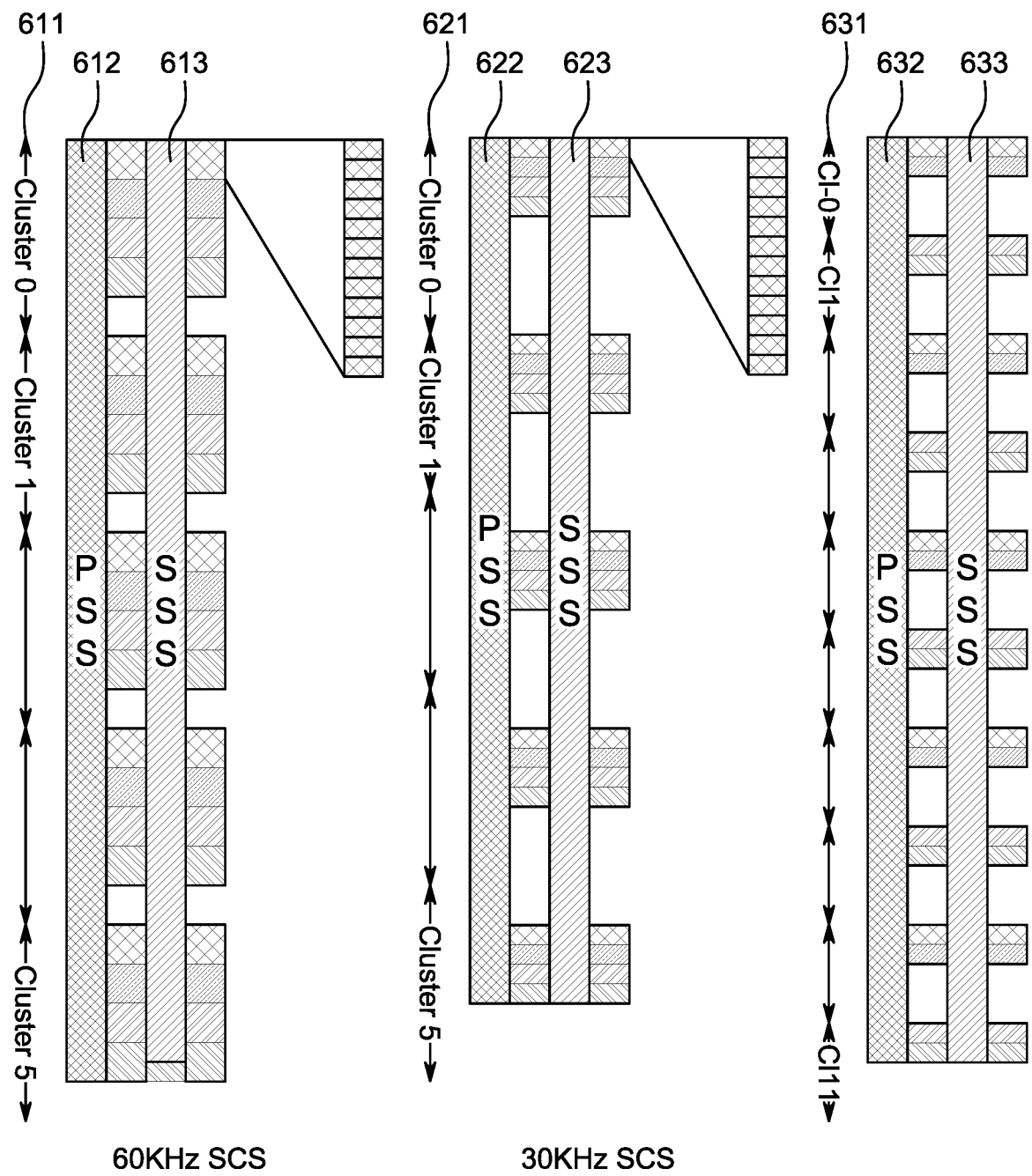
FIG. 6 shows examples of hybrid interlaced SS blocks.

Referring now to FIG. 6, a diagram illustrating more options for hybrid interlaced SS Block approaches for NR-U is shown. FIG. 6 shows examples of IFDMA-PSS/SSS and B-IFDMA-PBCH approaches.

Option 610 may include 60 kHz SCS, six clusters 611, four Interlaces 24 PRB, and IFDMA PSS 612 and SSS 613. If sub-RB clustering is used, twelve clusters with 4-6 sub-carrier interlaces may be used. Option 620 may include 30 kHz SCS, six clusters 621, eight interlaces, four assigned interlace, and IFDMA PSS 622 and SSS 623. Option 630 may include 30 kHz SCS twelve clusters 631, four interlaces, two assigned interlaces, and IFDMA PSS 632 and SSS 633.

Using blind detection, a WTRU may be able to derive one bit of information such as half-frame or a bit of SFN or a bit of SSBI as described above. A detailed SCS based design is described below in more detail. In the examples below, without loss of generality, it may be possible to first transmit PSS/SSS in IFDMA followed by two symbols of NR-U-PBCH of B-IFDMA.

The number of interlaces X may depend on Cell ID. For X=3, it may be a function of NID2. It may be a function of some other index. This approach may meet OCB requirements, may reduce interference from other cells, and may improve frequency reuse.

In DL, B-IFDMA may utilize power PSD better as it may occupy larger BW, for example, in cell ID dependent B-IFDMA solutions. The interlace structure may be numerology dependent or may be a function of numerology. An association between interlaced structure and numerology such as subcarrier spacing may be used. Three interlaces may be used and two interlaces may be empty between each cluster. A four interlace approach may be used where first interlace may be always on and the second interlace may be transmitted by a gNB and may be NID2 dependent or a function of NID2. Cyclic shift may be a function of NID2.

Demodulation references signal (DMRS) for PBCH may be self-contained in within the interlaces. Channel estimation for PBCH may suffer in B-IFDMA PBCH because of discontinuous assignment. RBG based channel estimation may perform worse than for the entire BW. Broader PSS/SSS may improve the PBCH channel estimation performance. This approach may use interlaced FDMA to take advantage of power allocation.

SCS dependent B-IFDMA approaches may be used. A B-IFDMA approach may use 3 parameters: number of subcarriers per block (M), number of blocks per interlace (L), and number of interlaces per symbol (N). This approach may be SCS dependent.

When 15 KHz SCS is used (96 RBs), there may be N interlaces (N=10 for 20 MHz, and N=5 for 10 MHz). Each interlace may include 10 equally spaced physical resource blocks. There may be N interlaces (N=12 for 20 MHz, and N=6 for 10 MHz). Each interlace may include 8 equally spaced physical resource blocks. There may be N interlaces (N=8 for 20 MHz, and N=4 for 10 MHz). Each interlace may include 12 equally spaced physical resource blocks.

When 30 KHz SCS is used (48 RBs), 6 interlaces may be defined. Each interlace may include 8 RBs that are uniformly separated 6 RBs apart. 8 interlaces may be defined. Each interlace may include 6 RBs that are uniformly separated 8 RBs apart.

With 60 KHz SCS, a sub-RB based interlace structure may be introduced (24 RBs). 6 interlaces may be used. Each interlace may include 8 sub-RBs. Each sub-RB may include 6 REs that are uniformly separated 3 RBs apart. 8 interlaces may also be used. Each interlace may include 6 sub-RBs. Each sub-RB may include 6 REs that are uniformly separated 4 RBs apart. 8 interlaces may also be used. Each interlace may include 12 sub-RBs. Each sub-RB may include 3 REs that are uniformly separated 2 RBs apart.

In NR, different channels that are subcarrier grid aligned may share the same sync block location. Accordingly, the sync block may not necessarily be RB aligned with the rest of the channel. The sync block edge may be offset by an arbitrary number of subcarriers (REs) relative to the rest of the channel. To access the actual channel, the WTRU may need to be aware of this offset. NR design may include the concept of floating sync, or SSB Sub-carrier offset. This offset may be indicated in MIB.

In the 5 GHz spectrum, different 20 MHz channels may not be not sub-carrier aligned. The 20 MHz raster may not be an integer multiple of 15 or 30 or 60 kHz SCS. Full wideband transmission may be of favorable, in which a gNB may be able to utilize single FFT in order to transmit multiple BWP. To achieve this, RB alignment may be needed as the as 20 MHz raster may not be an integer multiple of SCS (180 kHz RB).

In other example, each 20 MHz channel may be considered separate unit. Each channel may have its own SS/PBCH block. The SS/PBCH block may be used by only the channel it is present in and NR-U may not have a floating location requirement.

Different burst sets may be designed for different SCS, similar to NR. If NR-U coexists with LTE-LAA DRS, the collision of DRS location of LTE-LAA and NR-U communications transmitted from the same gNB may be minimized and/or the burst locations may be selected such that they don't overlap. It should be noted that the frequency of DRS is much lower than CRS in LTE, which makes the problem less severe.

FIGS. 7-14 and 17-23, as further described herein, include multiple rows where the top row in each figure represents a row of OFDM symbols.

Figure 7:
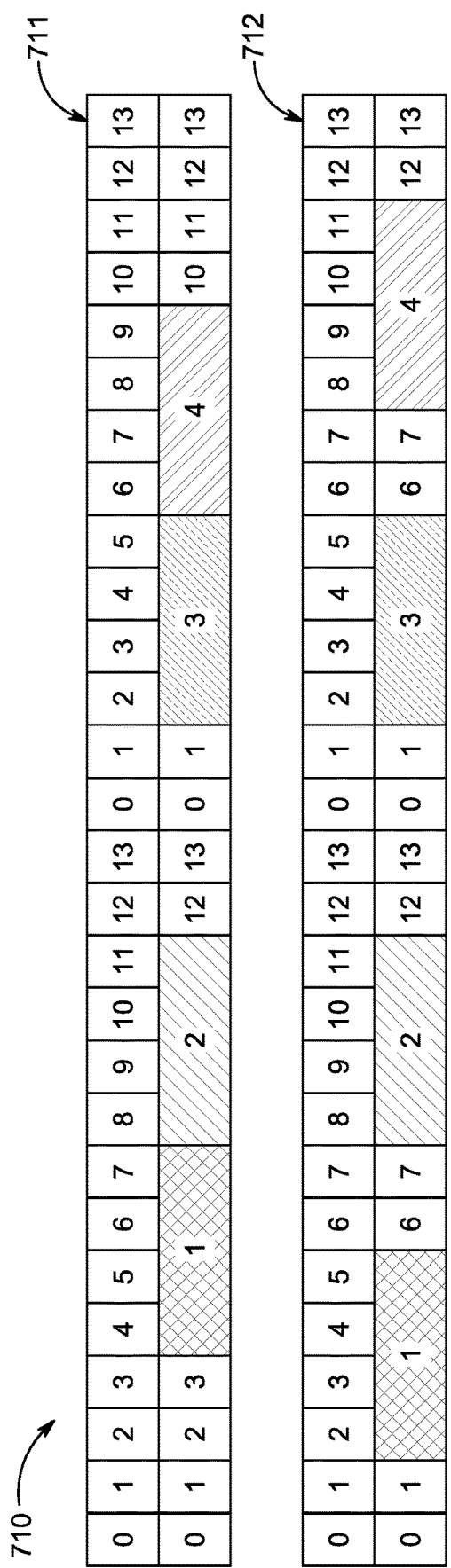
FIG. 7 shows examples of sub-carrier spacing (SCS) dependent SS blocks.

Referring now to FIG. 7, a diagram illustrating a 30 kHz SCS burst set 710 is shown. For 30 kHz SCS, the burst approach B ({2,8}+14n) as shown at 711 or C ({4, 8, 16, 20}+28n) as shown at 712 may be reused for NR-U. The DMTC (DRS-window) may be defined based on entire burst, or each group of SSBs or individual SS/PBCH block.

Figure 8:
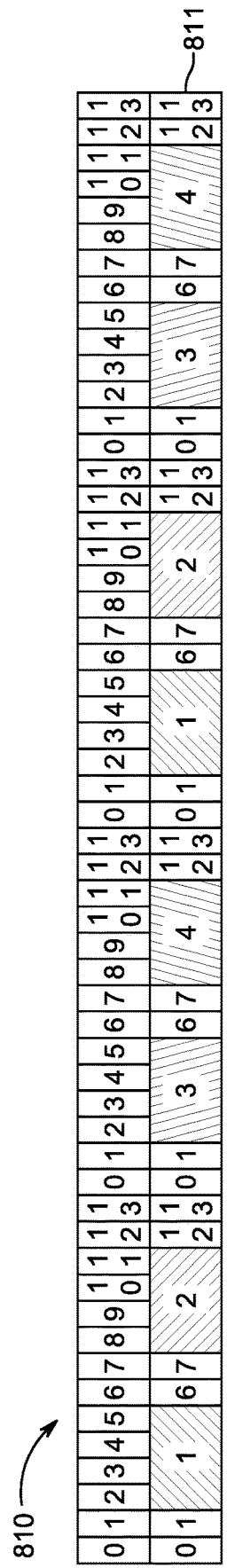
FIG. 8 shows examples of SCS dependent SS blocks.

Referring now to FIG. 8, a diagram illustrating a 60 kHz burst set 810 is shown. 60 KHz may use a similar burst approach as 30 kHz SCS or new SS Burst approaches may be used. The candidate locations may be present at {2,8}+14n as shown at row 811, where n is OFDM symbol number. There may be a gap of 33 µS between two symbols in group and 66 µS between the groups.

A more even distribution may be used where the candidates are present at {2,9}+14n, where different values of n may indicate different SS/PBCH groups r. There may be a gap of 49.5 µS between each candidate locations in entire burst. LBT may be performed before transmitting each SS/PBCH block. If the LBT fails, the SS/PBCH symbol may be skipped and may be transmitted at the end of burst indicating offset from its original location. This indication may be done in implicitly or explicitly in the NR-U PBCH.

Figure 9:
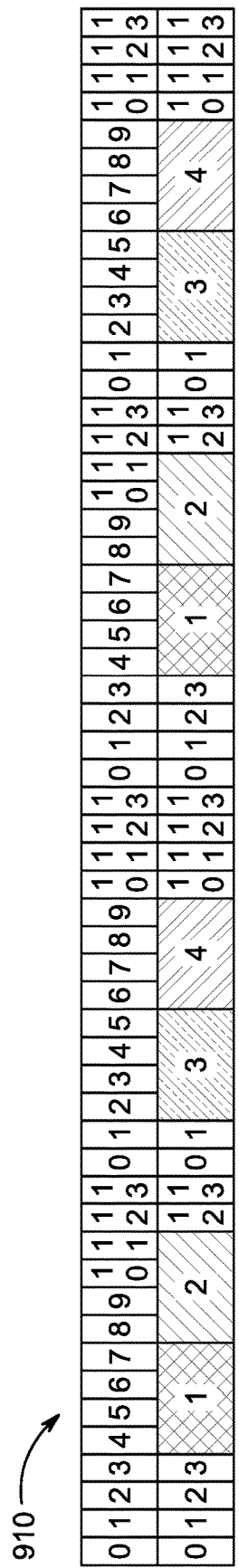
FIG. 9 shows examples of SCS dependent SS blocks.

Referring now to FIGS. 9 and 10, diagrams illustrating combined burst sets are shown. For 60 kHZ SCS SS-Burst shown at 910, the 2, 4, 6, 8 SS/PBCH blocks may be combined. In this approach two SS/PBCH may be next to each other. The candidate SS/PBCH location (or start of the window for DMTC) approach may be {4, 8, 16, 20}+28n, where different values of n may indicate different SS/PBCH groups. The distance between the 2nd and 3rd OFDM symbol may be 66 µS. Distance between the 4th and 5th SS/PBCH may be 132 µS. The LBT may be performed before the first SS/PBCH and the second SS/PBCH may be transmitted in the same COT. Reduced LBT may be performed before the third SS/PBCH block and the fourth SS/PBCH block may be transmitted without LBT. A longer LBT may be performed before the fifth SS/PBCH block as it may be part of the next SSB group. If the LBT fails, the transmission of two SS/PBCH adjacent to each other, such as SS/PBCH blocks 5, 6 (or in another group of 4 SS/PBCH blocks 5, 6, 7, 8) may be skipped and may be transmitted at the end of the burst with indication of the offset from the original location. This indication may be done in implicitly or explicitly in the NR-U PBCH.

In another approach, as shown at 1010 of FIG. 10, {4, 8, 16, 20}+*14*X*n may be used for individual SS-blocks in an SS-burst group, where X may be defined based on length of the DMTC. Different n may indicate different SS/PBCH groups. In this configuration, the DMTC may be defined for the group of SSB. Here, it may be possible to perform 1 or 2 LBT for an SSB group.

LBT may be performed at the beginning of the first SS/PBCH candidate in location 1. If the LBT is successful, SS/PBCH block 1, 2, 3, 4 of this group may be transmitted at their respective locations. If the LBT fails, the gNB may continue to listen within the DMTC window, shown at 1011, for the first SS/PBCH block and may transmit entire group of SS/PBCH group as soon as the channel clears. If the channel is not clear until the end of DMTC, the entire SS/PBCH group may skip the transmission of the SS/PBCH block. The relative locations of SS/PBCH in the DMTC window groups 1011, 1012, 1013, and 1014 may be the same. Hence the offset indicated by each of the SS/PBCH blocks may be same in the entire group.

In another approach, 2 LBT may be performed. One LBT may be performed at the start of SS/PBCH block 1 and another LBT may be performed at the start of SS/PBCH block 3 of the group. Even if the SS/PBCH blocks 1, 2 are transmitted at their original location with offset 0, the 3rd and 4th SS/PBCH blocks may be transmitted at a different offset within their own DMTC.

Referring now to FIGS. 11-14, diagrams illustrating numerology dependent DMTC/SS Block approaches for NR-U are shown. In one approach, four SS/PBCH may be next to each other, as shown at 1110 of FIG. 11. The candidate SS/PBCH locations (or start of the window for DMTC) may be {8, 12, 16, 22, 32, 36, 40, 44}+56n, as shown in row 1111. Different values of n may indicate different SS/PBCH groups. The distance between the 4th and 5th OFDM symbol may be 132 µS. The distance between the 4th and 5th SS/PBCH may be 264 µS. LBT may be performed before the $1^{st}$, $2^{nd}$, $3^{rd}$, and $4^{th}$ SS/PBCH, which may be transmitted in the same COT. A reduced LBT may be performed before SS/PBCH block 3 and SS/PBCH blocks 5-8 may be transmitted without LBT. A longer LBT may be performed before the 9th SS/PBCH block as it may be part of the next SSB group. If the LBT fails, the transmission of four SS/PBCH adjacent to each other, such as SS/PBCH blocks sub-group if 4 SS/PBCH blocks (or in another possibility entire group of 8 SS/PBCH blocks) may be skipped and may be transmitted at the end of the burst with indication of the offset from the original location. This indication may be done in implicitly or explicitly in the NR-U PBCH.

Figure 12:
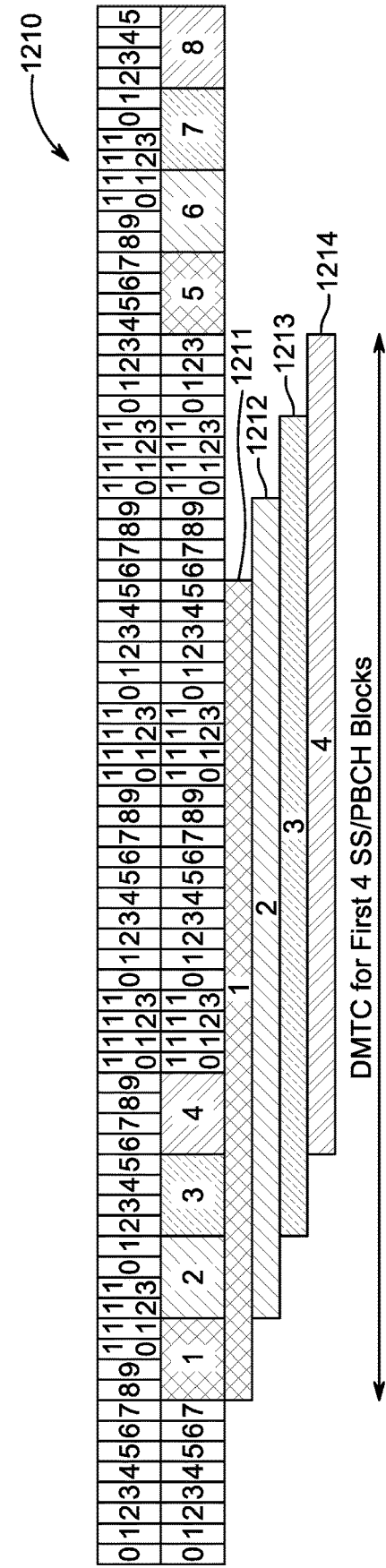
FIG. 12 shows examples of numerology dependent DMTC/SS blocks.

In another approach, {8, 12, 16, 22}+56*X*n may be used for individual SS-block candidate locations in a SS-burst group, where X may be defined based on length of the DMTC, as shown in FIG. 12. Different values of n may indicate different SS/PBCH groups. In this configuration, the DMTC may be defined for the group of SSB. LBT may be performed at the beginning of the SS/PBCH candidate location 1. If the LBT is successful, SS/PBCH blocks 1, 2, 3, 4 of this group may be transmitted at their respective location. If the LBT fails, the gNB may continue to listen within the DMTC window, shown at 1211, for the first SS/PBCH block and may transmit entire group of SS/PBCH group as soon as the channel clears. If the channel is not clear until the end of DMTC, the entire SS/PBCH group may skip the transmission of the SS/PBCH block. If the channel is clear, the entire SS/PBCH group may be transmitted within a new DMTC window, such as 1212, 1213, or 1214. The offset indicated by each of the SS/PBCH block may be same in the entire group.

Figure 13:
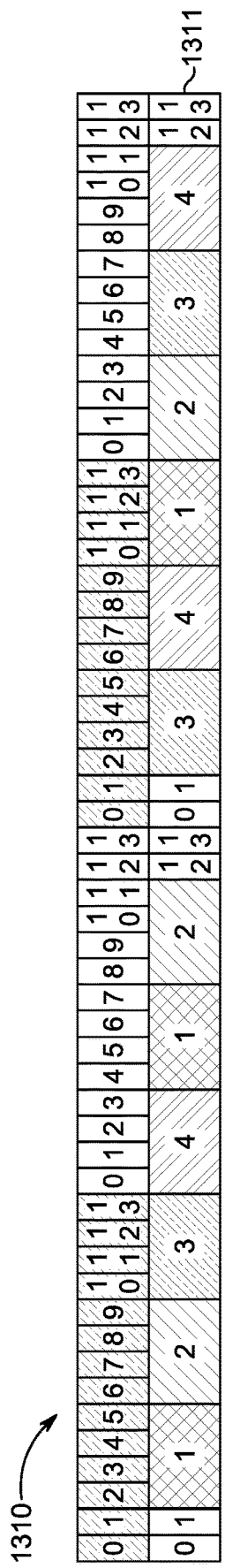
FIG. 13 shows examples of numerology dependent DMTC/SS blocks.

In another approach, as shown in FIG. 13 at 1310, six SS/PBCH candidate locations may be next to each other, as shown in row 1311. The candidate SS/PBCH location (or start of the window for DMTC) approach may be {2, 6, 10, 14, 18, 22}+28*n*X, where n is OFDM symbol number. X may be defined based on length of the DMTC. If X=1, the gap between two groups of SS/PBCH may be 4 OFDM symbol or 66 µS. The LBT may be performed before each group of SS/PBCH and they may be transmitted in the same COT. If the LBT fails, the transmission of six SS/PBCH adjacent to each other may be skipped and may be transmitted at the end of the burst with indication of the offset from the original location. This offset indication may be done in implicitly or explicitly in the NR-U PBCH. As 64 is not integer multiple of 6, there may be 11 or 12 groups of SSBs defined to include all the 64 candidate locations. The remaining spots may become candidate locations for missed opportunity SS/PBCH blocks. If X>1, depending on the length of DMTC, these 6 SS/PBCH candidate locations may float in the window. The offset may be included implicitly or explicitly in the NR-U PBCH.

Figure 14:
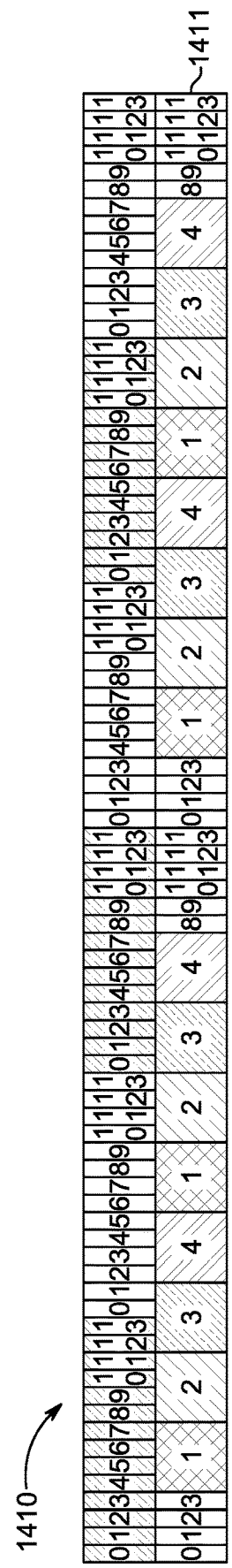
FIG. 14 shows examples of numerology dependent DMTC/SS blocks.

In another approach, as shown at FIG. 14 at 1410, eight SS/PBCH candidate locations may be next to each other, as shown at row 1411. The candidate SS/PBCH location (or start of the window for DMTC) approach may be {4, 8, 12, 16, 20, 24, 28, 32}+42*n where n is OFDM symbol number. The distance between the 8th and 9th OFDM symbol may be 132 µS. The distance between the 4th and 5th SS/PBCH is 165 µS. LBT may be performed before each group of 8SS/PBCH locations. A longer LBT may be performed before the 9th SS/PBCH block as it may be part of the next SSB group. If the LBT fails, the transmission of four SS/PBCH adjacent to each other, SS/PBCH blocks sub-group of 8 SS/PBCH blocks may be skipped and may be transmitted at the end of the burst with indication of the offset from the original location. This indication may be done in implicitly or explicitly in the NR-U PBCH.

In the approaches above, hierarchical LBT may be performed. LBT for SSB1 and SSB2 for the 120 kHz approach and LBT for SSBs 1, 2, 3, 4 for the 240 kHz approach may be performed before starting SSB1 transmission. The approaches above may be extended to more than 4 OFDM symbols.

Figure 15:
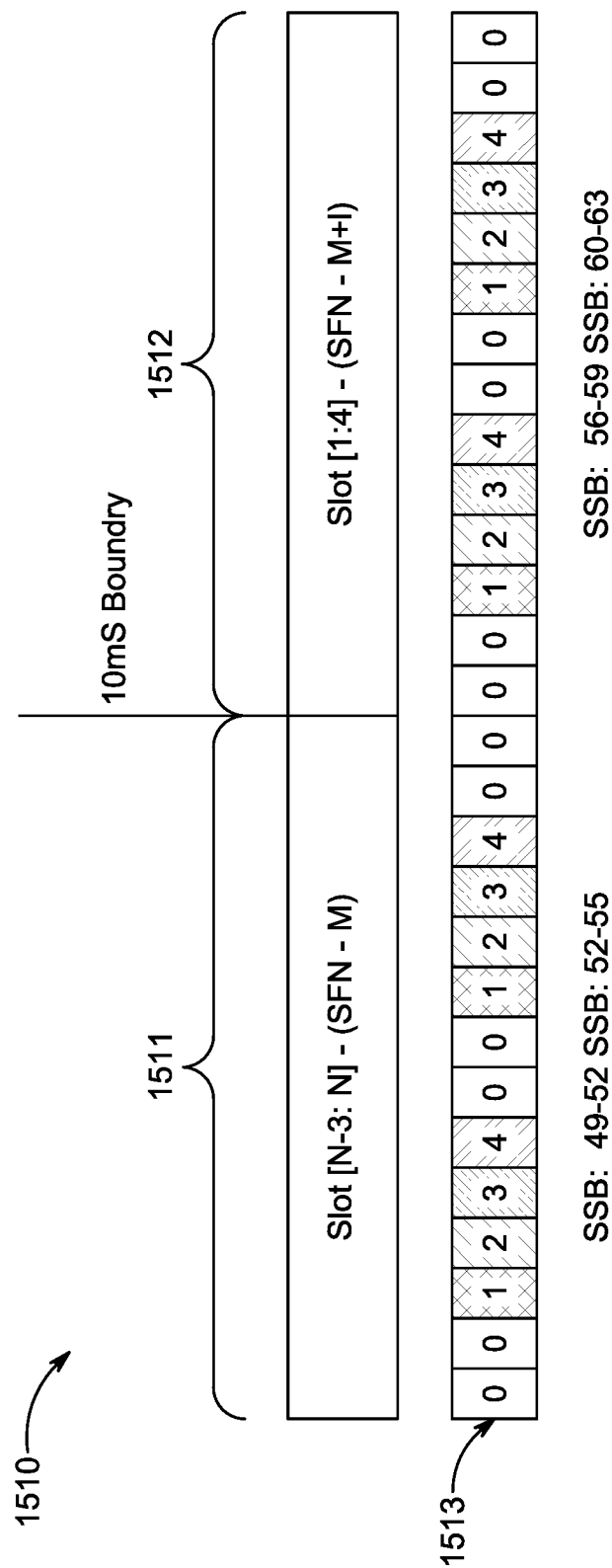
FIG. 15 shows examples of indications for floating SS blocks.
Figure 16:
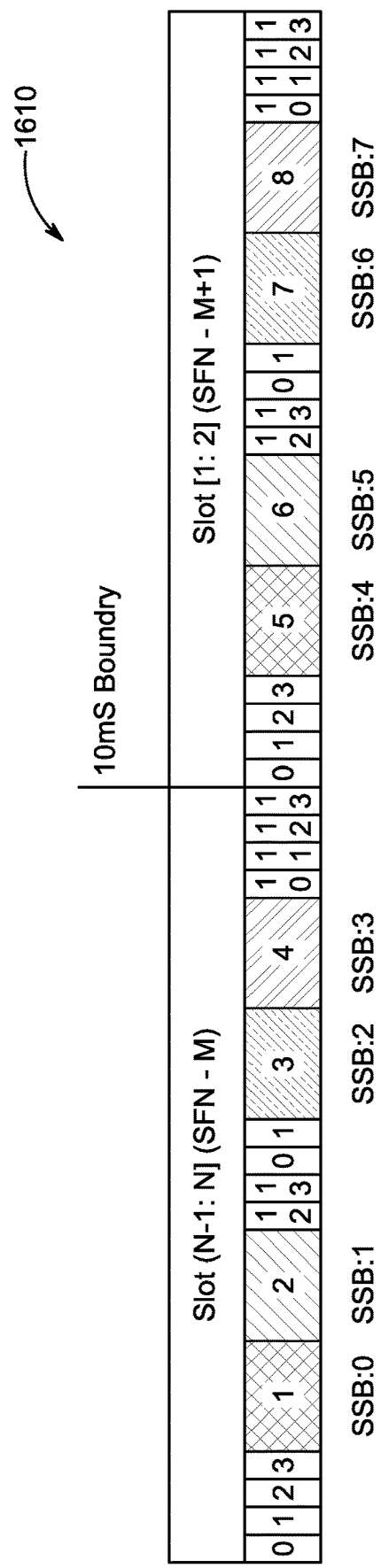
FIG. 16 shows examples of indications for floating SS blocks.

Referring now to FIGS. 15-16, diagrams illustrating an indication for floating SSBs are shown. An entire SS/PBCH burst set may be floating in time because of LBT failure. DMTC may be defined for the entire burst. The offset (e.g., in terms of slots) from the frame boundary where the DMTC starts may be indicated.

A DRS burst may be 2 mS long, as shown at FIG. 15. If a first part 1511 of burst starts at 9 mS and second part 1512 of burst goes to next system-frame, the offset from the frame-boundary may create ambiguity about which SFN to indicate, or how much offset to indicate. Each block in row 1513 represents four OFDM symbols. A 240 kHz SCS config Case E–{8, 12, 16, 22, 32, 36, 40, 44}+56n may be adapted for SSBs in NR-U. FIG. 16 shows a 30 kHz SCS configuration where {4, 8, 16, 20}+28n is provided and may be adapted for SSBs in NR-U.

One approach may be to limit the DMTC to 8 mS, which may be the duration of radio frame and the duration of the SS-Burst-Set. The entire Burst-Set may be transmitted in the same radio frame. This approach may avoid frame ambiguity. This approach may reduce the duration of DMTC and the number of occasions where the DRS may be transmitted.

Another approach may be to use a 1-bit indication that the transmitted SSB is part of previous SFN. If it is part of a previous radio frame and the periodicity of DRS is one radio frame, the location for the two radio frames may collide and only one of them may be transmitted.

Yet another approach may be using SFN of the original DRS location without LBT with an exact offset. If the SSBI+Offset>N_SSB, a WTRU may automatically interpret that the SS-Burst-Set overflows into next radio frame and may use SFN_actual=SFN+1.

In another approach, the entire SS-Burst may be floating in time, but there may be no crossover to the next frame. In this case, X Bits may be used to indicate the offset of the first SSB of the SSBurst or SSBGroup within an SSB Burst and along with SSBI. For example, IndicatedOffset=ActualOffset mod frameDuration. SFN may be indicated in PBCH. If the offset is greater than frameDuration, the following SFN may be indicated. One SSBI of SSburst may be in frame X and the following SSBI of the SSBurst may be in frame X+1.

Referring now to FIGS. 17-23, diagrams illustrating SFN based activation for SS/PBCH groups are shown. Particular SSB Groups may be activated based on the SFN number. This may increase the spacing between two SSB groups and may provide a longer DMTC window, thereby providing more opportunities to transmit DRS. This type of sparse DRS cycle, along with a wake up signal, may be used for high efficiency power saving. An implicit indication of a few bits of a SFN may be performed. For example, if four groups are considered to be activated based on SFN, 2 bits of information of the SFN may be implicitly included in the process of activation. At the WTRU, SFN bits may be computed by knowing the SSBI of activated SS/PBCH block.

If SFN mod N=0, as shown in FIG. 17 at 1710, SS/PBCH-Group 1 may be transmitted, with Group 1 indicated by 1712 and the Group 2 indicated by 1713.

If SFN mod N=1, as shown in FIG. 18 at 1810, SS/PBCH-Group 2 may be transmitted. DMTC may start at the original candidate location of Group 2 at 1811. Using the SSBI, the offset in DMRC, and a known original location, the timing of the slot may be computed at the WTRU.

Figure 19:
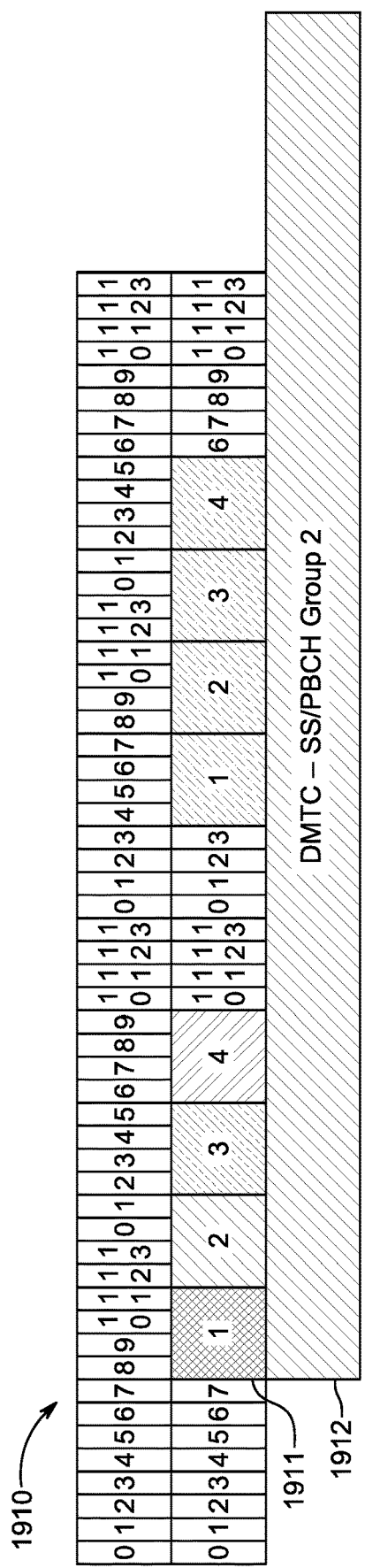
FIG. 19 shows examples of System Frame Number (SFN) based activation for SS/PBCH groups.

In another approach, Group 2 DMTC may start at the original candidate location 1911 of Group 1, as shown in FIG. 19. As shown at 1910, Groups may start at the same location in different SFN. Using the SFN indicated in PBCH, an included offset within the DMTC 1912 and the SSBI the timing of slot may be computed at the WTRU without ambiguity.

If DMTC is defined for each group of SSBs, or in other words, if each group is floating in DMRC, the following structures may be used for DRS-Burst. There may be one SSB Group with 2 SSBs in a slot, 2 SSB Groups with 1 slot periodicity, 4 SSB Groups with 2 slot periodicities, and 8 SSB Groups with 4 slot periodicities. The candidate locations for the DRS may be (8, 12, 16, 22, 32, 36, 40, 44)+56n.

There may be two SSB groups of 4 SSBs each with a separate DMTC for each group. The candidate locations for the DRS may be {8, 12, 16, 22}, {32, 36, 40, 44}+56n. LBT may be performed individually for DRS located at {8, 12, 16, 22} and DRS located at candidate locations {32, 36, 40, 44}. The structure may be repeated after 14×4=56 slots (periodicity of 4 slots).

There may be one SSB Group of 6 SSBs with 2 slot periodicities. SSBs may be located at the locations {2, 6, 10, 14, 18, 22}+28n. The locations may be adjacent to one another. The structure may be repeated after 14×2=28 slots.

There may be one SSB Group of 8 SSBs adjacent to each other with 3 slot periodicity. The SSBs may be located at the locations {4, 8, 12, 16, 20, 24, 28, 32}+42n. The structure may be repeated after 14×3=42 slots.

The approaches above may be useful if small amount of data is FDM with SSBs in the beam. However if larger amount of data is to be TDM with the SSB, the DRS may need to be sparser. DMTC may be defined for SS/PBCH block groups or SSB-groups that are floating in DMTC. SFN based activation may be used for individual SSBs in the group.

Figure 20:
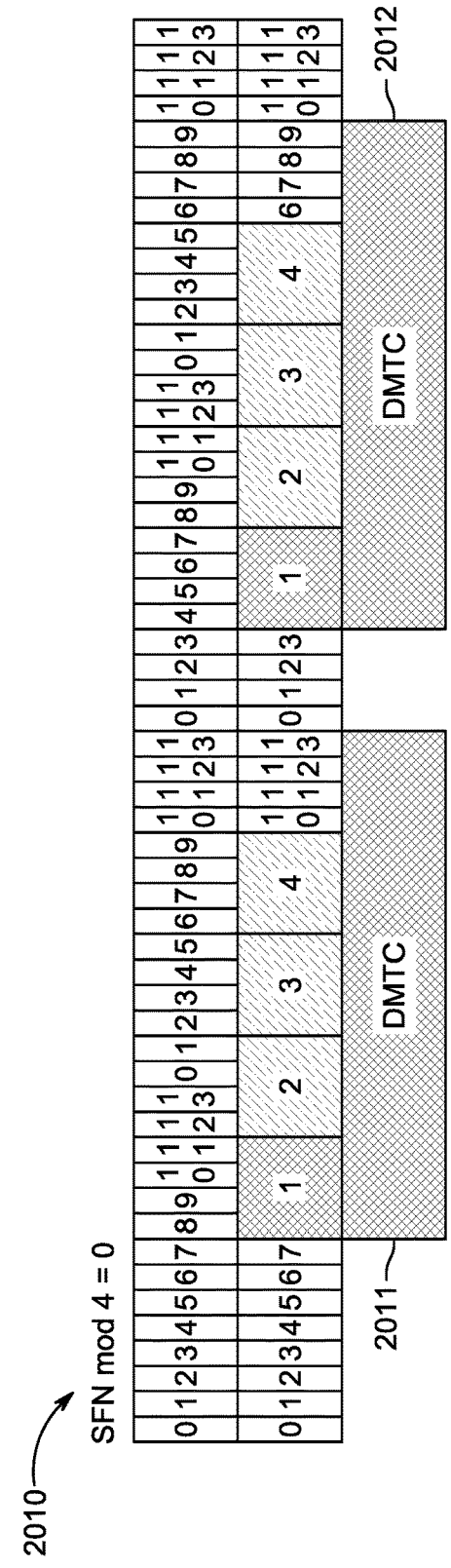
FIG. 20 shows examples of System Frame Number (SFN) based activation for SS/PBCH groups.

SFN based SS/PBCH block (candidate location) activation may be performed. This may reduce SSB overhead by performing sparse transmission. More data may be multiplexed. Periodicity may be configurable. If SFN mod N=0, SS/PBCH with SSBI 4N+1 may be transmitted, as shown in FIG. 20 at 2010 with DMTC 2011 and DMTC 2012.

Figure 21:
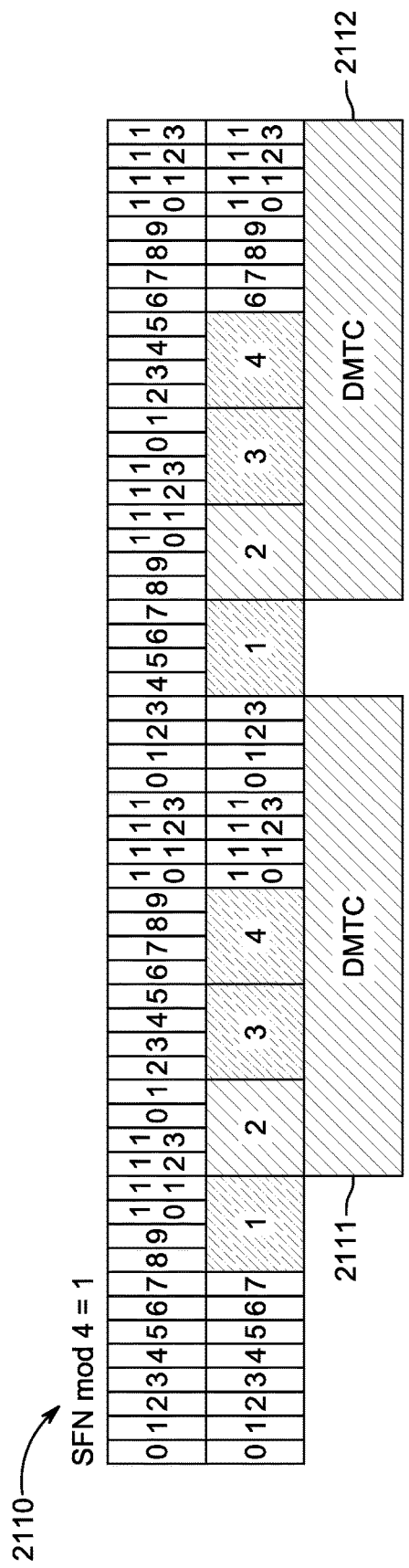
FIG. 21 shows examples of System Frame Number (SFN) based activation for SS/PBCH groups.
Figure 22:
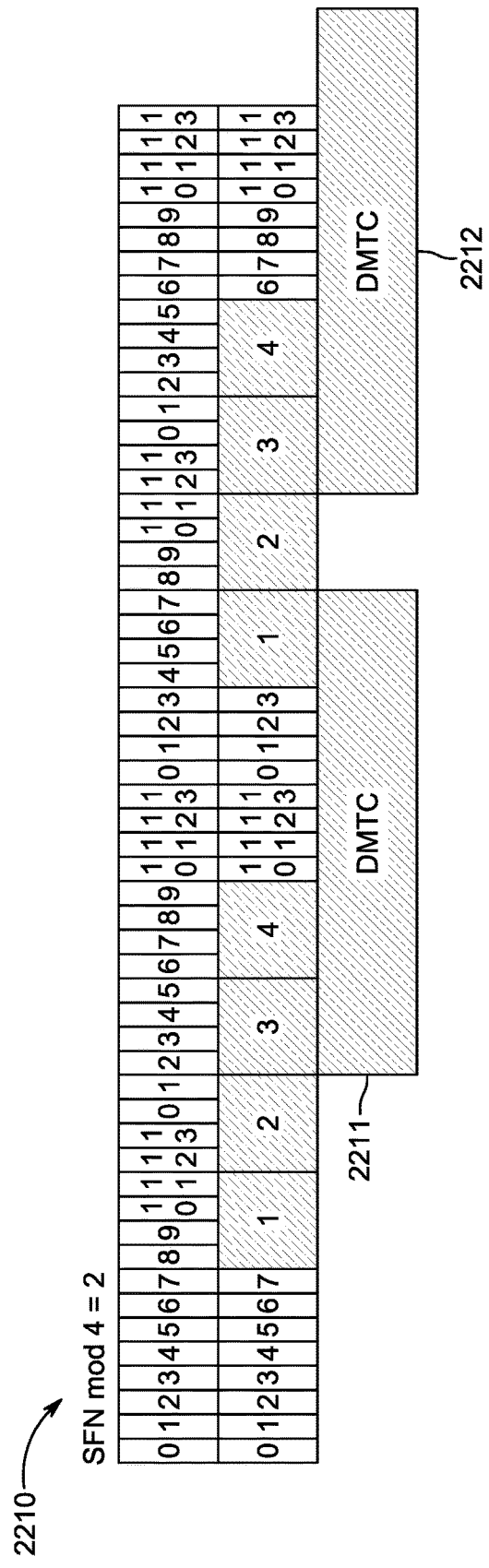
FIG. 22 shows examples of System Frame Number (SFN) based activation for SS/PBCH groups.
Figure 23:
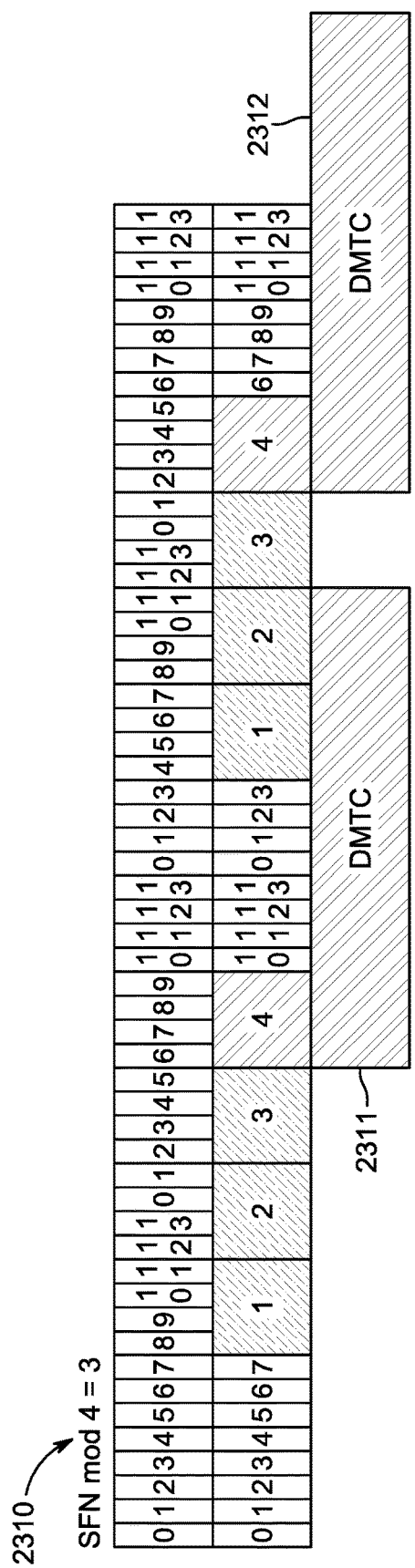
FIG. 23 shows examples of System Frame Number (SFN) based activation for SS/PBCH groups.

If SFN mod N=1, SS/PBCH with SSBI 4N+2 may be transmitted as shown in FIG. 21 at 2110 with DMTC 2111 and DMTC 2112. If SFN mod N=2, SS/PBCH with SSBI 4N+3 may be transmitted as shown in FIG. 22 at 2210 with DMTC 2211 and DMTC 2212. If SFN mod N=3, SS/PBCH with SSBI 4N+4 may be transmitted as shown in FIG. 23 at 2310 with DMTC 2311 and DMTC 2312.

SFN based activation for SSB-Group and SFN based activation individual SSBs may be configured and may be switched based in the load in the system. The above may be used in the system at the same time with different periodicity.

DMTC may be aligned with the original SSB candidate location or frame boundary. Detection of SSBI may provide 2 LSB of SFN. A different number X (instead of 4) may be used. This may change (e.g., decrease or increase) the periodicity of SS/PBCH. Periodicity of SS/PBCH may be configured.

A soft combining operation within SS bursts and/or a soft combining operation across different SS bursts may be implemented.

If the offset for floating DRS (in time) is included in the PBCH, the information content in PBCH may change every SS/PBCH block. Soft combining for PBCH intra SFN or inter-subframe may be difficult. One approach may be to indicate the offset outside of PBCH-Payload. Limited candidate locations may be used (e.g., 16 locations) and an indication of the location may be used.

The indication may be performed via SSS cyclic shifts. The complexity of SSS may be higher for initial access, but once the cell ID is known to the WTRU, estimating the cyclic shift and hence offset may be very simple.

Indication may also be performed via another signal or channel such as a tertiary synchronization signal (TSS). The TSS may be interlaced with PSS, SSS, or PBCH. TSS may be in separate OFDM symbols. Modifications for scrambling may be possible. If the slot offset is derived from TSS or SSS, this may be used for the descrambling of post-encoded PBCH. A pre-CRC first scrambling may be based on cell ID and part of the SFN. A post-encoder second scrambling may be based on cell ID+Y [4] bits of slot offset.

Another approach may be to change the first scrambling. The data scrambling may be based on the pre-CRC scrambling initialized with cell ID and part of the SFN. This may avoid blind decoding of PBCH in case of one-shot detection and may provide varying interference between two cells for improving the performance of soft combining via consecutive transmissions across SFN. A post-encoder second scrambling may be used and may be based on cell ID. The SSBI may be carried in DMRS, and the pattern of SS/PBCH block in time may be known. Combining across different SS/PBCH may also be possible. Due to LBT failure, the SSBs may not be located at the same locations as the original burst definition. This slot offset may be used in the pre-CRC scrambling. For example, a pre-CRC first scrambling may be based on cell ID, part of SFN and Y [4] bits of slot offset. A post-encoder second scrambling may be based on cell ID.

Frame based equipment (FBE) may not require the offset described above. The DRS may be aligned with the frame boundary and the entire SS-burst may fit in DRS if omni-LBT is performed for the burst. If multiple directional LBT are required for directional transmission of different SSB-groups, different groups may have to be transmitted in a different frame of FBE. For each frame transmission, 25 µs of LBT may be performed. If the channel is found to be clear, the directional transmission may be performed.

For different burst approaches, timing acquisition during FBE/Load based equipment (LBE) may need to be unified. As FBE may not need the same amount of offset indication as LBE, some of the bits may be repurposed for FBE functionality. However a one bit indication of FBE may be needed in the PBCH, preamble, or initial signal that may be transmitted at the beginning of frame transmission.

If one of the SSBs from the SSB Group is not transmitted, or transmission for the frame is discontinuous, LBT may need to be performed again. If LBT fails, the relative structure of SS Burst may be altered. A cyclically extended SSB may be used.

Two categories of LBT used for LTE-LAA are Category 2 and 4. Category 2 of LBT means LBT without a random back-off. The duration of time that the channel is sensed to be idle before the transmitting entity transmits may be deterministic. This may be used for DL transmission bursts less than 1+x ms, where x<<1 ms. Hence this type of LBT may be used for DRS.

For data and other transmissions, the transmission burst may be >1 mS and Category 4 may be used. Category 4 is LBT with random back-off with a contention window of variable size. In Category 4 LBT, the transmitting entity may draw a random number N within a contention window. The size of contention window may be specified by the minimum and maximum value of N. The transmitting entity may vary the size of the contention window when drawing the random number N. The random number N may be used in the LBT procedure to determine the duration of time that the channel is sensed to be idle before the transmitting entity transmits on the channel. This may include different priority of transmission, which may allow sensing of the channel for different duration and providing different durations for COTs. Different designs for SS-Burst may be possible based on LBT, as further disclosed herein.

In a first design, Category 2 LBT may provide a short COT of 1 ms, which may not cover a full sweep of SSB, especially considering that 15 kHz SCS and 8 SSBs may occupy 4 ms and 30 kHz SCS 8 SSBs may occupy 2 ms.

In a second design, Category 4 LBT may include different priorities. Depending on priority, it may provide a short COT of 2 mS, which may be able to include the entire SSB sweep. It may also include RMSI if RMSI is FDM and transmitted within the SSB duration. However, this may not cover two individual sweeps for SSB and RMSI.

In a third design, a lower priority Category 4 LBT may be used. It may provide the longest COT (e.g., up to 10 ms). This may cover both DRS and RMSI. However, this may include random back-off with much longer contention window. This longer random back-off may not be desirable for DRS transmission for good performance of system or initial access and mobility.

Another design may be COT dependent. If an SS-Burst-Set is anticipated to occupy a longer duration than the maximum COT available, a multiple Category 2 LBT within the SS-Burst-Set may be a used instead of only one LBT for the entire burst. In this approach, multiple bursts of DRS/SSB may be considered and may fit in the current COT (e.g., 1 ms). If directional LBT is performed, the SSB pointing in a similar general direction may be considered as part of the burst of DRS/SSB.

Figure 24:
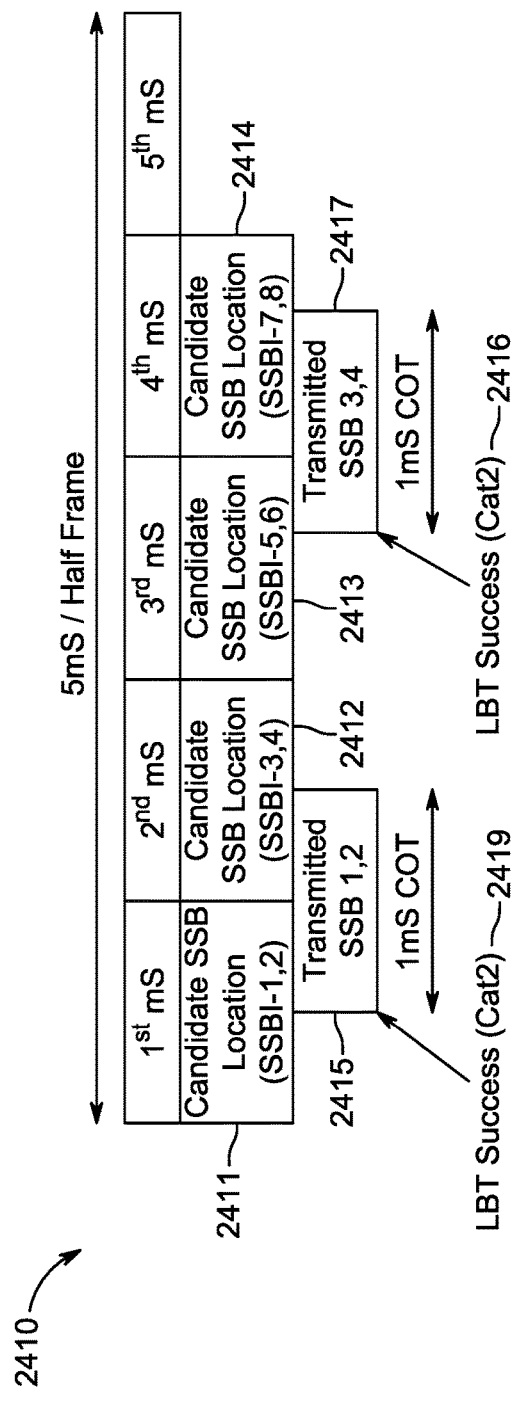
FIG. 24 shows multiple Category 2 listen before talk (LBT) within a half frame (15 kHz SCS)

FIG. 24 is a diagram illustrating multiple Category 2 LBT within a half frame and 15 kHz SCS where 15 kHz SCS-$L_{SSB}$=8. The 5 ms half frame 2410 includes multiple candidate SSB locations 2411, 2412, 2413, and 2414 where an LBT success 2419 results in a transmitted SSB 2415 and an LBT success 2416 results in a transmitted SSB 2417.

Figure 25:
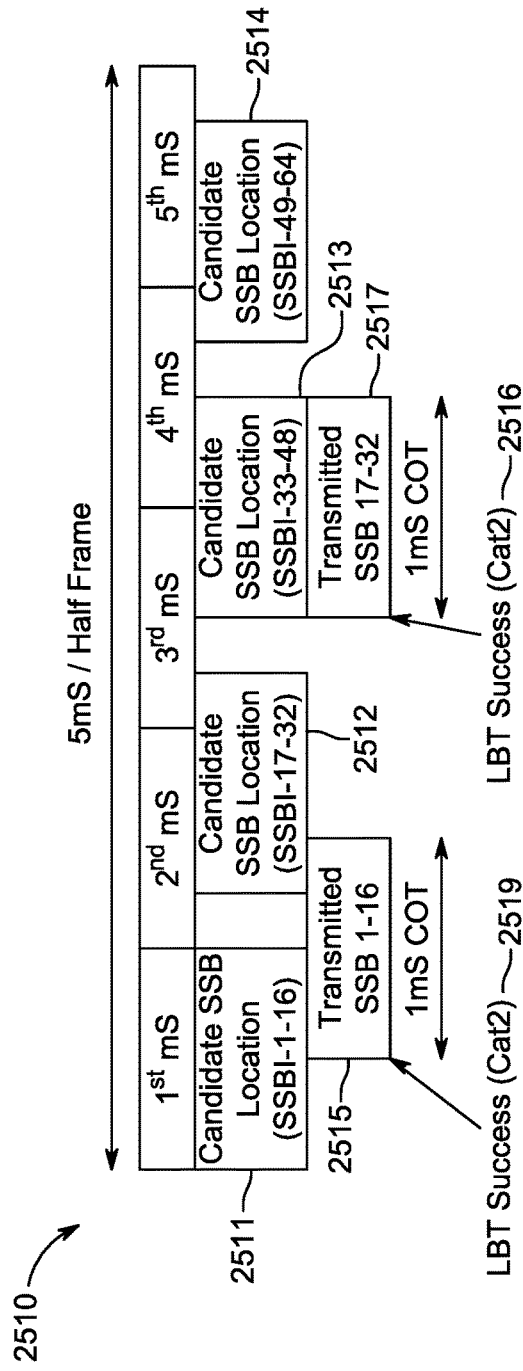
FIG. 25 shows multiple Category 2 LBT within a half frame (120 kHz SCS)

FIG. 25 is a diagram illustrating multiple Category 2 LBT within a half frame and 120 kHz SCS where 120 kHz SCS-$L_{SSB}$=64. The 5 ms half frame 2510 includes multiple candidate SSB locations 2511, 2512, 2513, and 2514 where an LBT success 2519 results in a transmitted SSB 2515 and an LBT success 2516 results in a transmitted SSB 2517.

An SS-Burst-Set structure may be modified based on duration of available COT. Different SS-Burst-Set structures may be tabulated and associated with COT. SSB/DRS may carry the COT indication. This indication may be carried by PBCH or in the initial signal that may be transmitted before the DRS. A WTRU may detect the initial signal and decode the COT. Using the COT, the WTRU may be able to identify, calculate, or find from a table the duration and the structure of DRS/SS-Burst-Set. Using the identified structure and the SSBI of the DRS/SSB, the WTRU may be able to calculate the timing and acquire the timing information.

Category 4 LBT may be performed at DRS transmission for one periodicity and Category 2 LBT may be performed for DRS at different periodicity. For example, Category 4 LBT may be performed at every 40 ms, and once the channel is acquired, an entire SS-Burst-Set may be transmitted. At the same time, Category 2 LBT may be performed every 5 ms, and if the channel is acquired, some or all of the SS-Burst-Set may be transmitted. For initial access, the WTRU may use the Category 4 LBT with the entire Burst-Set. However, connected mode WTRUs may use the more frequently transmitted part of SS-Burst-Set with Category 2 LBT. Priority for LBT Category 4 may be selected based on the COT required to include all the actually transmitted SSB. For example, if actually transmitted $L_{SSB}$=4, only 2 ms COT may be required and high priority Category 4 LBT may be performed. However, if actually transmitted $L_{SSB}$=8, then lower priority Category 4 LBT may be used.

Priority for LBT (e.g., LBT Category 4) may depend on actually transmitted SSBs and may be determined based on actually transmitted SSBs or the number of actually transmitted SSBs. The LBT category may depend on actually transmitted SSBs and may be determined based on actually transmitted SSBs or the number of actually transmitted SSBs. A WTRU may receive an indication in RMSI for information of actually transmitted SSBs (e.g., $L_{SSB}$). A WTRU may obtain the COT information based on the information of actually transmitted SSBs in RMSI. A WTRU may determine how to monitor SSBs based on the determined COT.

Priority for LBT (e.g., LBT Category 4) may depend on maximum number of SSBs and may be determined based on maximum number of SSBs. The priority for LBT Category 4 may be selected based on maximum number of SSBs, L. For example, if a maximum number of SSBs is large (i.e., L is large), a high priority Category 4 LBT may be selected and performed. However, if maximum number of SSBs is small (i.e., L is small), a low priority Category 4 LBT may be selected and used. The LBT category may depend on maximum number of SSBs and may be determined based on maximum number of SSBs. For example, if maximum number of SSBs is large (i.e., L is large), Category 4 LBT may be selected and performed. However, if maximum number of SSBs is small (i.e., L is small), Category 2 LBT may be selected and used. Other combinations or orders are also possible.

An LBT Category may depend on maximum number of SSBs and may be determined based on a maximum number of SSBs. An LBT Category may be selected based on a maximum number of SSBs, L. For example, if the maximum number of SSBs is large (i.e., L is large), Category 4 LBT may be selected and performed. However, if the maximum number of SSBs is small (i.e., L is small), Category 2 LBT may be selected and used.

The DRS/SS-Burst-Set transmission and reception may depend on frequency and may be based on frequency range. The LBT category and/or priority (e.g., the priority for Category 4 LBT) may depend on frequency and may be determined based on frequency range. The LBT category for DRS/SS-Burst-Set transmission and reception may depend on frequency and may be based frequency range. For example, in one frequency range (e.g., frequency range 1), one LBT category (e.g., Category 2 LBT) may be used while in another frequency range (e.g., frequency range 2), another LBT category (e.g., Category 4 LBT) may be used. Priority for LBT for DRS/SS-Burst-Set transmission and reception may depend on frequency and may be based on frequency range. For example, one priority class (e.g., low priority) may be used in one frequency range (e.g., frequency range 1) and another priority class (e.g., high priority) may be used in another frequency range (e.g., frequency range 2).

Figure 26:
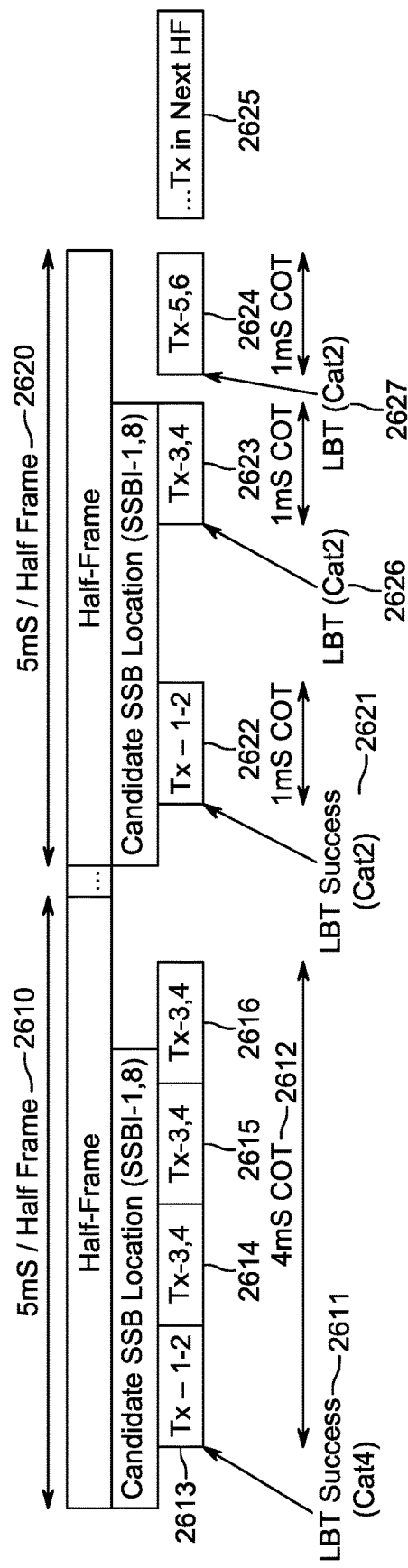
FIG. 26 shows hybrid LBT Category 2 and Category 4 with different periodicities.

FIG. 26 is a diagram illustrating hybrid LBT Category 2 and Category 4 with different periodicities. As shown, half frame 2610 is a 5 ms half frame and a successful category 4 LBT 2611 results in the transmission of a full block including Tx 2613, 2614, 2615, and 2616 over a 4 ms COT period 2612. Half frame 2620 is a 5 ms half frame and a successful category 2 LBT 2621 results in the transmission of a 1 ms COT Tx 2622, a successful category 2 LBT 2626 results in another 1 ms COT Tx 2623, a successful category 2 LBT 2627 results in another 1 ms COT Tx 2624. A similar successful category 2 LBT may result in additional ~1 ms COT transmissions such as Tx 2625.

An LBT scheme may be needed that gives longer COT with shorter LBT that may be used for SSB/DRS purposes. In a scheme like this, with a short LBT, a WTRU may acquire COT that includes all the SSB/DRS including the RMSI.

When an existing transmission is over, but the remaining COT may cover part of DRS/SSB-Burst-Set, and there may be different possibilities for subsequent actions. A gNB may transmit the part of the DRS/SSB Burst that is covered by an existing COT and may perform the LBT again to transmit the remaining part of the DRS/SSB Burst. The initial signal before the DRS may indicate the remaining COT. A WTRU may be able to decode this remaining COT and identify the SS-Burst-Set structure. This may be used if the RMSI/OSI/Paging associated with LBT can also be part of the COT and transmission, or no RMSI/OSI/Paging is transmitted along with this DRS/SSB due to different frequency of transmission.

Figure 27:
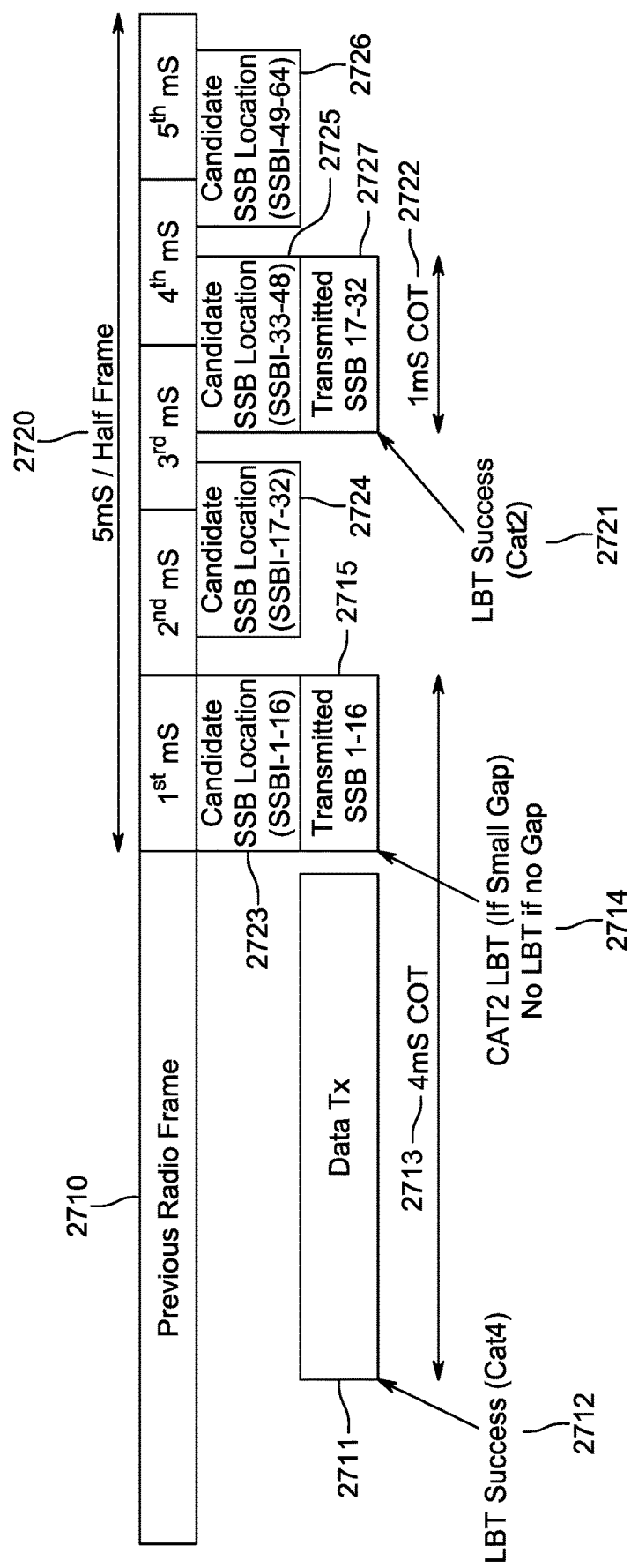
FIG. 27 shows using existing channel occupancy time (COT) for SS blocks (SSB)

FIG. 27 is a diagram illustrating a method of using existing COT for SSB. The example in FIG. 27 is shown where 120 kHz SCS–$L_{SSB}$=64. A successful category 4 LBT 2712 results in the transmission of data 2711 during a previous radio frame 2710. The data 2711 is transmitted during a subset of the 4 ms COT 2713 such that a subset of time remains within the 4 ms COT 2713 after the data 2711 is transmitted. As shown, the 4 ms COT 2713 extends into a 5 ms half frame 2720 where a CAT2 LBT is performed if a gap exists between the transmission of data 2711 and a subsequent transmission 2715 and no LBT is performed if a gap does not exist. Transmission 2715 is completed within the 4 ms COT 2713 and may overlap with candidate SSB location 2723 of the half frame 2720. Additional candidate SSB locations 2724, 2725, and 2726 are available, as shown. A subsequent successful category 2 LBT 2721 may be performed prior to transmission 2727 during a 1 ms COT 2722.

Alternatively, the gNB may let go of the existing remaining COT and perform another LBT to acquire COT for all or part of an SS-Bust-Set.

The design of Synchronization-Burst in multi beam scenario is a trade-off between overhead and flexibility due to LBT requirements for unlicensed spectrum and WTRU complexity. Due to LBT failure, the SSB/DRS in SS-Burst-Set may be shifted as is or cyclically rotated and shifted. The total duration of this possible shift in burst may be similar to one complete SS-Burst-Set duration (e.g., for higher SCS of 60 kHz and low value of L=8).

The SS-burst-set duration may be 1 ms using a conventional NR structure. The entire SS-Burst-Set may shift in time (e.g., due to LBT) up to a maximum 1 ms. If the maximum shift is larger, WTRU complexity for receiving SSB/DRS may increase as the WTRU may have to monitor for SSBs in every slot due to uncertainty. Hence, in this design, at the transmitter, the channel may be expected to be available in 1 ms. However, in a high traffic scenario, the channel may not be free within 1 ms and the gNB may not be able to transmit the DRS/SS-Burst-Set until the next opportunity. The gNB may check the channel at every potential SSB location, which may happen approximately 10 times in 1 ms. This granularity of ¹/₁₀ ms may be too low and too frequent for performing LBT. For example, in LTE-LAA/Multefire, the DRS window may be defined to be 10 ms long for LBT availability (granularity may be 1 ms and LBT may be performed every 1 ms).

The window for shift due to LBT may be larger (e.g., 5 ms to 10 ms), and the transmission occasion may be sparser. For example, 60 kHz SCS and 8 SSBs may occupy 1 ms. The entire sweep may be moved to 10 different burst locations, separated by 1 ms in one radio frame.

Figure 28:
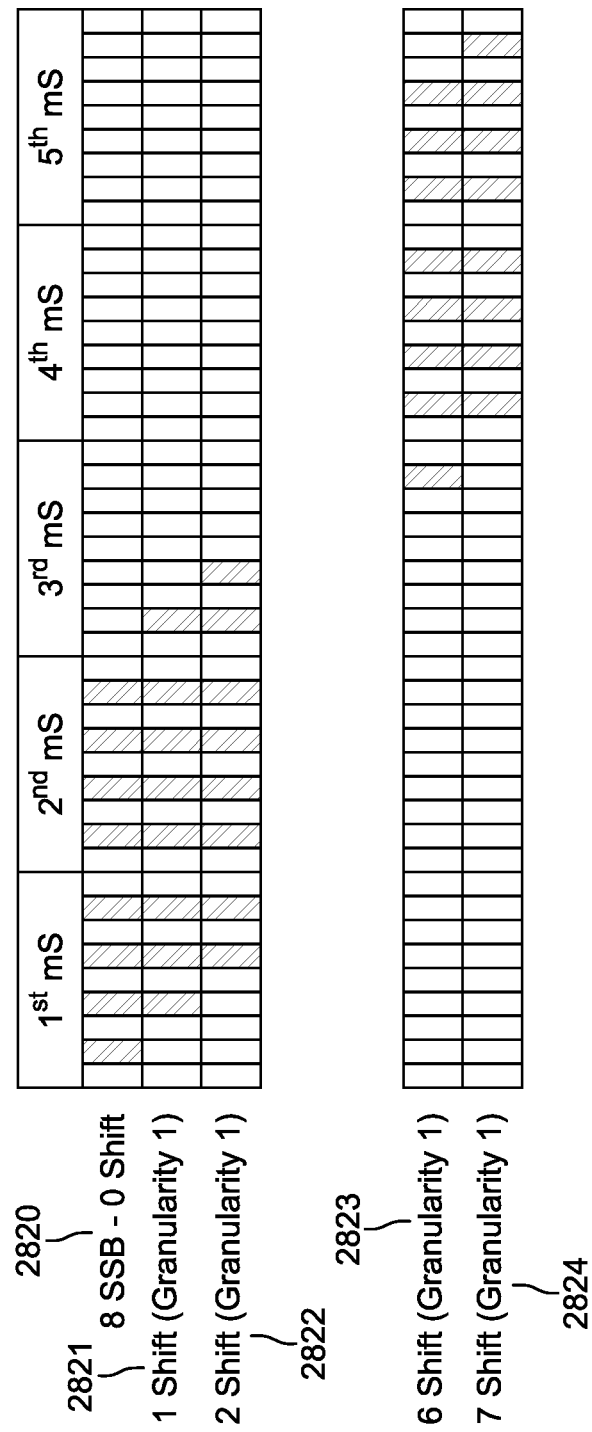
FIG. 28 shows ten shifts of SSBs with Granularity 1 (30 kHz SCS, $L_{SSB}=8$)

FIG. 28 is a diagram illustrating eight shifts of SSBs with a granularity 1 (30 kHz SCS, $L_{SSB}$=8). As shown, 2820 shows SSBs without any shift and is sequentially followed by 2821 with one shift, 2822 with two shifts and continues to 2823 with six shifts and 2824 with seven shifts.

The granularity of shift (or the density of the transmission occasion) may be a variable duration based on the load/traffic (or level of business of the channel). As the duration of shift changes, the location of the DRS occasion also may change. These duration and location of DRS occasion may be indicated to the WTRU.

A table or formula for DRS location may be defined depending on DRS duration. This may be part of RMSI or RRC signaling. It may be indicated to a WTRU every time the duration of the window is changed due to change in traffic load. A default shift may be predefined and may be used periodically by gNB. This may be used by the initial access WTRUs.

Figure 29:
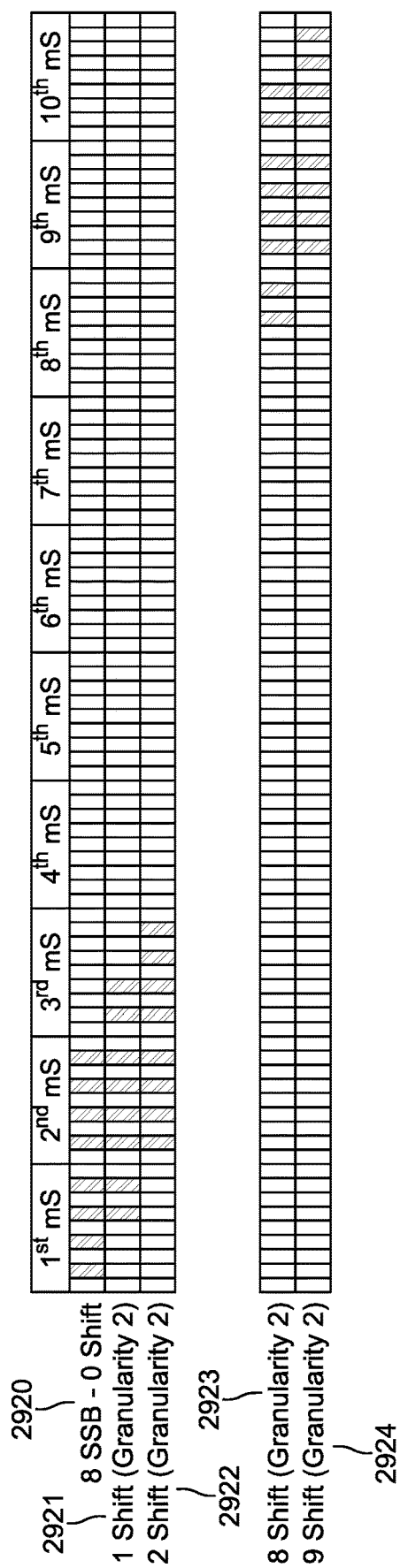
FIG. 29 shows ten shifts of SSBs with Granularity 2 (30 kHz SCS, $L_{SSB}=8$)

FIG. 29 is a diagram illustrating ten shifts of SSBs with a granularity 2 (30 kHz SCS, $L_{SSB}$=8). As shown, 2920 shows SSBs without any shift and is sequentially followed by 2921 with one shift of granularity 2, 2922 with two shifts of granularity 2 and continues to 2923 with eight shifts of granularity 2 and 2924 with nine shifts of granularity 2.

If the shift is too long, a transmission may move to the next half-frame. This may be indicated by half-frame indicator and may be identified by the WTRU. However, DRS periodicity of 5 ms may not be used.

The granularity may be as high as 8 where an SS-Burst-Set occupies 1 ms (e.g., L=8 and SCS=60 kHz). When the shift duration is 1 ms, the SS-Burst-Set may start in different SSBs with a different shift.

Figure 30:
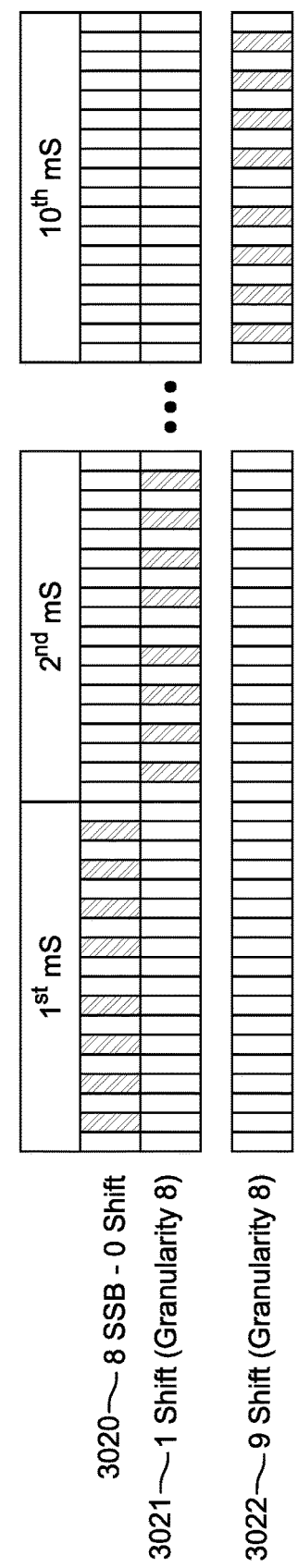
FIG. 30 shows ten shifts of SSBs with Granularity 8 (60 kHz SCS, $L_{SSB}=8$)

FIG. 30 is a diagram illustrating ten shifts of SSBs with granularity 8 (60 kHz SCS, $L_{SSB}$=8). As shown, 3020 shows SSBs without any shift and is sequentially followed by 3021 with one shift of granularity 8, and continues to 3022 with nine shifts of granularity 8.

The 15 kHz SCS configuration may include 5 slots in one half-frame. In NR SS-Burst design, each slot may have 2 SSB locations. Hence, there may be 10 DRS transmission occasions (SSB candidate locations) in the half-frame. In an example, 8 SSB/DRS may occupy 4 ms and 1 ms (or 2 occasions) may be empty. As shown in Table 1, after 10 occasions, the half-frame may change.

TABLE 1

DRS shifted because of LBT Success at different locations

| Half Frame (15 kHz SCS) | 1 | 1 | 1 | 1 | 1 | 1 | 1 | 1 | 1 | 1 | 2 | 2 | 2 | 2 | 2 | 2 | 2 | 2 | 2 | 2 |
|---|---|---|---|---|---|---|---|---|---|---|---|---|---|---|---|---|---|---|---|---|
| DRS Transmission Occasion | 0 | 1 | 2 | 3 | 4 | 5 | 6 | 7 | 8 | 9 | 0 | 1 | 2 | 3 | 4 | 5 | 6 | 7 | 8 | 9 |
| SSBI: If LBT Success @ Occ 0 | 0 | 1 | 2 | 3 | 4 | 5 | 6 | 7 | | | | | | | | | | | | |
| SSBI: If LBT Success @ Occ 1 | | 0 | 1 | 2 | 3 | 4 | 5 | 6 | 7 | | | | | | | | | | | |
| SSBI: If LBT Success @ Occ 2 | | | 0 | 1 | 2 | 3 | 4 | 5 | 6 | 7 | | | | | | | | | | |
| SSBI: If LBT Success @ Occ 3 | | | | 0 | 1 | 2 | 3 | 4 | 5 | 6 | 7* | | | | | | | | | |
| SSBI: If LBT Success @ Occ 4 | | | | | 0 | 1 | 2 | 3 | 4 | 5 | 6* | 7* | | | | | | | | |
| SSBI: If LBT Success @ Occ 5 | | | | | | 0 | 1 | 2 | 3 | 4 | 5* | 6* | 7* | | | | | | | |
| SSBI: If LBT Success @ Occ 6 | | | | | | | 0 | 1 | 2 | 3 | 4* | 5* | 6* | 7* | | | | | | |
| SSBI: If LBT Success @ Occ 7 | | | | | | | | 0 | 1 | 2 | 3* | 4* | 5* | 6* | 7* | | | | | |
| SSBI: If LBT Success @ Occ 8 | | | | | | | | | 0 | 1 | 2* | 3* | 4* | 5* | 6* | 7* | | | | |
| SSBI: If LBT Success @ Occ 9 | | | | | | | | | | 0 | 1* | 2* | 3* | 4* | 5* | 6* | 7* | | | |

At the WTRU, this may be detected using a half-frame indicator if the DRS transmission periodicity is assumed to be 10 ms or higher. For 5 ms periodicity of DRS, there may be an ambiguity for the locations highlighted in the tables with an asterisk. At those candidate locations, either DRS/SSB of the second half frame may be transmitted or the shifted DRS/SSB of first half frames may be transmitted with offset creating ambiguity. The occasion where LBT for SS-Burst-Set is successful may be considered as offset for each DRS/SSB in entire set. If LBT was successful at Nth occasion, each SSB may considered as N-offset. If LBT was successful at 5th slot of a radio frame (or 0th slot of second half-frame), it may be considered as 0-offset with half frame indication. SSBI may be still included in DMRS of PBCH like NR. This offset from original location may be included in in PBCH, which may change in every time LBT is performed.

A 3 bit indication may be used for offset along with SSBI indication to indicate up to 8 shifts. A 4 bit indication may be used for offset along with SSBI indication for indicating 9-16 shifts. As there may be a maximum of 20 DRS potential occasions in 1 SFN for a configuration with 8 DRS/SSB in the 15 kHz SCS mode, a maximum 12 shifts may be possible. If the transmission of SSB needs to be shifted to next radio frame, it may create SFN ambiguity.

For 15 kHz SCS, duration between 2 SSBs in same slot may be 142.86 μs and duration between 2 SSBs across the slot may be 285.68 μs. Since this duration is much larger than 25 μs, if contiguous transmission is not possible, a LBT may need to be performed. This is shown in Table 2 below.

TABLE 2

Indication of LBT Success when LBT is performed SS-Bursts individually

| Half Frame (15 kHz SCS) | 1 | 1 | 1 | 1 | 1 | 1 | 1 | 1 | 1 | 1 | 2 | 2 | 2 | 2 | 2 | 2 | 2 | 2 | 2 | 2 |
|---|---|---|---|---|---|---|---|---|---|---|---|---|---|---|---|---|---|---|---|---|
| DRS Transmission Occasion | 0 | 1 | 2 | 3 | 4 | 5 | 6 | 7 | 8 | 9 | 0' | 1' | 2' | 3' | 4' | 5' | 6' | 7' | 8' | 9' |
| SSBI: If LBT Success @ Occ 0/4 | 0 | 1 | 2 | 3 | | | | | 4 | 5 | 6* | 7* | | | | | | | | |
| Offset for DRS in case above | 0 | 0 | 0 | 0 | | | | | 4 | 4 | 4* | 4* | | | | | | | | |
| SSBI: If LBT Success @ Occ 5/2' | | | | | | 0 | 1 | 2 | 3 | | | | 4* | 5* | 6* | 7* | | | | |
| Offset for DRS in case above | | | | | | 5 | 5 | 5 | 5 | | | | 8* | 8* | 8* | 8* | | | | |
| SSBI: If LBT Success @ Occ 5/7' | | | | | | 0 | 1 | 2 | 3 | | | | | | | | 4* | 5* | 6* | 7* |
| Offset for DRS in case above | | | | | | 5 | 5 | 5 | 5 | | | | | | | | 12* | 12* | 12* | 12* |

An occasion where LBT was successful may be used as offset for all the contiguous SSB/DRS following it. If there was another LBT due to gap, the offset indicated in the DRS may change. The offset for each LBT may be computed as Offset=(Occasion where DRS is transmitted)−(where DRS was supposed to be transmitted without LBT).

The 30 kHz configuration may include 10 slots in one half frame. There may be 20 DRS transmission occasions in the half-frame. In an example, 8 SSB/DRS may occupy 2 ms and 3 ms (6 slots or 12 occasions) may not have SSBs in NR. Up to 32 offsets may be used in one radio frame (40 occasions in one radio frame—8 SSB). Similarly, the 60 kHz configuration may include 20 slots in one half frame. There may be 40 DRS transmission occasions in the half-frame. In an example, 8 SSB/DRS may occupy 1 ms and 4 ms (8 slots or 32 occasions) may not have SSBs in NR. Up to 72 offsets may be used. The 30 kHz and 60 kHz SCS may be better candidates keeping the NR 8 SSB Burst design for FR1.

For 30 kHz SCS, a duration between 2 SSBs in the same slot may be 71.43 μs and duration between 2 SSBs across the slot may be 142.86 μs in case of pattern 2/Case C. For 60 kHz SCS, a duration between 2 SSBs in same slot may be 35.71 μs and duration between 2 SSBs across the slot may be 71.43 μs in case of pattern 2/Case C. The duration in both cases is much larger than 25 μs. Hence, if contiguous transmission is not possible, a LBT may need to be performed. This is shown in Table 3 below.

TABLE 3

| SSBI: DRS shifted because of LBT Success at different locations ($^{30}/_{60}$ kHz SCS) | | | | | | | | | | | | | | | | | | | | |
|---|---|---|---|---|---|---|---|---|---|---|---|---|---|---|---|---|---|---|---|---|
| Half Frame ($^{30}/_{60}$ kHz SCS) | 1 | 1 | 1 | 1 | 1 | 1 | 1 | 1 | 1 | 1 | 1 | 1 | 1 | 1 | 1 | 1 | 1 | 1 | 1 | 1 |
| DRS Transmission Occasion | 0 | 1 | 2 | 3 | 4 | 5 | 6 | 7 | 8 | 9 | 0 | 1 | 2 | 3 | 4 | 5 | 6 | 7 | 8 | 9 |
| SSBI: If LBT Success @ Occ 0 | 0 | 1 | 2 | 3 | 4 | 5 | 6 | 7 | | | | | | | | | | | | |
| SSBI: If LBT Success @ Occ 1 | | 0 | 1 | 2 | 3 | 4 | 5 | 6 | 7 | | | | | | | | | | | |
| SSBI: If LBT Success @ Occ 2 | | | 0 | 1 | 2 | 3 | 4 | 5 | 6 | 7 | | | | | | | | | | |
| SSBI: If LBT Success @ Occ 3 | | | | 0 | 1 | 2 | 3 | 4 | 5 | 6 | 7 | | | | | | | | | |
| SSBI: If LBT Success @ Occ 4 | | | | | 0 | 1 | 2 | 3 | 4 | 5 | 6 | 7 | | | | | | | | |
| SSBI: If LBT Success @ Occ 5 | | | | | | 0 | 1 | 2 | 3 | 4 | 5 | 6 | 7 | | | | | | | |
| SSBI: If LBT Success @ Occ 6 | | | | | | | 0 | 1 | 2 | 3 | 4 | 5 | 6 | 7 | | | | | | |
| SSBI: If LBT Success @ Occ 7 | | | | | | | | 0 | 1 | 2 | 3 | 4 | 5 | 6 | 7 | | | | | |
| SSBI: If LBT Success @ Occ 8 | | | | | | | | | 0 | 1 | 2 | 3 | 4 | 5 | 6 | 7 | | | | |
| SSBI: If LBT Success @ Occ 9 | | | | | | | | | | 0 | 1 | 2 | 3 | 4 | 5 | 6 | 7 | | | |

An occasion where LBT was successful may be used as offset for all the contiguous SSB/DRS following it. If there was another LBT due to gap, offset indicated in the DRS may change. The offset for each LBT may be computed as Offset=(Occasion where DRS is transmitted)−(where DRS was supposed to be transmitted without LBT).

SSBs dropped due to LBT failure may be cyclically wrapped around to the end of the burst set transmission. The start of the SS/PBCH block burst set may be truncated upon LBT failure and the dropped indices may be cyclically wrapped around to the end of the burst set transmission. The WTRU may compute an effective SS/PBCH block index given by the detected SS/PBCH block index modulo N. This effective SS/PBCH block index may then be used instead of the detected SS/PBCH block index for other purpose, an exception being frame timing, for which the WTRU may use the actual detected SS/PBCH indices instead of the effective indices.

The value of N may be signalled in RMSI. A default value of N depending on the sub-carrier spacing may be used for initial access. The mechanism to indicate cyclic shift to WTRUs is disclosed herein. In many cases, SSBs may be transmitted at the original location of the NR. If not transmitted at the original location, an indication may be needed for timing offset. The indication may be a 1-bit indication (along with SSBI) to show that SSB is in the next (not the original) location for 8 possible shifts. A 2-bit indication may be needed for 9-16 possible shifts. The indication may be done in PBCH.

Table 4 shows cyclically shifted DRS based on LBT successes at different locations such as Slots 0 through Slot 7.

TABLE 4

| SSBI: DRS Cyclically shifted because of LBT Success at different locations | | | | | | | | | | | | | | | | | | | | |
|---|---|---|---|---|---|---|---|---|---|---|---|---|---|---|---|---|---|---|---|---|
| Half Frame (30 kHz SCS) | 1 | 1 | 1 | 1 | 1 | 1 | 1 | 1 | 1 | 1 | 1 | 1 | 1 | 1 | 1 | 1 | 1 | 1 | 1 | 1 |
| Transmission opportunity | 0 | 1 | 2 | 3 | 4 | 5 | 6 | 7 | 8 | 9 | 0 | 1 | 2 | 3 | 4 | 5 | 6 | 7 | 8 | 9 |
| SSBI: If LBT Success in Slot 0 | 0 | 1 | 2 | 3 | 4 | 5 | 6 | 7 | | | | | | | | | | | | |
| SSBI: If LBT Success in Slot 1 | | 1 | 2 | 3 | 4 | 5 | 6 | 7 | 0 | | | | | | | | | | | |

TABLE 4-continued

SSBI: DRS Cyclically shifted because of LBT Success at different locations

| | | | | | | | | | |
|---|---|---|---|---|---|---|---|---|---|
| SSBI: If LBT Success in Slot 2 | 2 | 3 | 4 | 5 | 6 | 7 | 0 | 1 | |
| SSBI: If LBT Success in Slot 3 | | 3 | 4 | 5 | 6 | 7 | 0 | 1 | 2 |
| SSBI: If LBT Success in Slot 4 | | | 4 | 5 | 6 | 7 | 0 | 1 | 2 | 3 |
| SSBI: If LBT Success in Slot 5 | | | | 5 | 6 | 7 | 0 | 1 | 2 | 3 | 4 |
| SSBI: If LBT Success in Slot 6 | | | | | 6 | 7 | 0 | 1 | 2 | 3 | 4 | 5 |
| SSBI: If LBT Success in Slot 7 | | | | | | 7 | 0 | 1 | 2 | 3 | 4 | 5 | 6 |

As described above, for 15 kHz SCS, duration between 2 SSBs in the same slot may be 142.86 µs and duration between 2 SSBs across the slot may be 285.68 µs. For 30 kHz SCS, duration between 2 SSBs in the same slot may be 71.43 µs and duration between 2 SSBs across the slot may be 142.86 µs in case of pattern 2/Case C. For 60 kHz SCS, duration between 2 SSBs in the same slot may be 35.71 µs and duration between 2 SSBs across the slot may be 71.43 µs in case of pattern 2/Case C. In both cases, the duration is much larger than 25 µs. If the transmission is discontinuous in either case, another LBT may be required. It may not be possible to acquire the channel exactly at the desired location. This discontinuous transmission may make the cases less flexible. Along with the next slot indicator described above, an offset may have to be indicated as well.

TABLE 5

DRS Cyclically Shifted, LBT is performed SS-Bursts individually

| | | | | | | | | | | | | | | | | | | | | |
|---|---|---|---|---|---|---|---|---|---|---|---|---|---|---|---|---|---|---|---|---|
| Half Frame (30 kHz SCS) | 1 | 1 | 1 | 1 | 1 | 1 | 1 | 1 | 1 | 1 | 1 | 1 | 1 | 1 | 1 | 1 | 1 | 1 | 1 | 1 |
| Transmission opportunity | 0 | 1 | 2 | 3 | 4 | 5 | 6 | 7 | 8 | 9 | 0 | 1 | 2 | 3 | 4 | 5 | 6 | 7 | 8 | 9 |
| SSBI: If LBT Success in Slot 0 | | | 2 | 3 | 4 | 5 | | | | | 6/0* | 7/1* | 0 | 1 | | | 6* | 7* | | |
| Next half frame indication | | | 0 | 0 | 0 | 0 | | | | | 1/1* | 1/1* | 1 | 1 | | | 1* | 1* | | |
| Offset | | | | | | | | | | | 4/0* | 4/0* | 4 | 4 | | | 0* | 0* | | |
| SSBI: If LBT Success in Slot 4 | | | | | 4 | 5 | 6 | 7 | | | | | | | 0 | 1 | 2 | 3 | | |
| Next half frame indication | | | | | 0 | 0 | 0 | 0 | | | | | | | 1 | 1 | 1 | 1 | | |
| Offset | | | | | | | | | | | | | | | 3 | 3 | 3 | 3 | | |

If a transmission is only 4 SSBs long and COT was lost, only SSBs with SSBI 0, 1, 2, 3 may be transmitted. To transmit SSB 0, the WTRU may have to wait for SSB occasion 0 of the next half-frame or try to acquire the channel before occasion 0, use a reservation signal or some other data during until the occasion 0, and then transmit the SSB 0 in timely fashion. The same would occur for transmission of SSBs 6 and 7. This is shown with an asterisk for SSBs [0, 1, 6, 7] in Table 5.

An offset may be used in addition to the next-slot indicator. This offset may indicate the distance from the next slot potential location. This is shown for SSBs [6, 7, 0, 1] in Table 5.

LBT may be successful at occasion 4 in the first half-frame and the COT may be lost thereafter. For the SSBs [0, 1, 2, 3], the next-half-frame indicator may be 1. This may indicate a cyclically rotated (e.g., as a cyclic rotation indicator) SSB and an offset of 3 locations from DRS occasion [8, 9, 0, 1] respectively. The offset indicator may be 3.

Frame timing or frame boundary may be determined based on SS block index within a half frame and/or half frame indicator. For example, if WTRU may detect the SS block, obtain the SS block index, and half radio frame indicator in the SS block. The WTRU may determine the frame timing or frame boundary by both SS block index and half radio frame indicator. WTRU may determine that the detected SS block is in the first half radio frame or second half radio frame frame (i.e., the $1^{st}$ or $2^{nd}$ half radio frame of a frame) based on half radio frame indicator. The WTRU may further determine the SS block location within the determined half radio frame. With both determined half radio frame and SS block location within the determined half radio frame, and together with a fixed offset, the WTRU may determine the frame timing and/or a frame boundary. As an example, a frame may have a 10 ms duration and a half radio frame may have a 5 ms duration.

The SSB index may be flexibly positioned and timing information may be indicated to transmit SSBs when dropped due to LBT failure. Multiple associations may be defined between DRS/SSB occasions the SSBI. The associations may be tabulated or computed using a determined function. One of the configurations may be selected from these associations. A slot and symbol location may not be associated with a predetermined SSB index. Rather, the NW may schedule a certain SSB index (from a small set of possibilities) in a slot and symbol location. The NW may control the frequency of the different SSB indices that are transmitted post-LBT over a longer term.

Multiple tables for the association between DRS/SSB and SSBI may be defined. The tables may be based on sub-carrier spacing, load of the system. The tables to be used may be indicated in RRC or identified using system parameters including the sub-carrier spacing. There may be too many associations. One SSB location may use different indices. Signaling may be used for unambiguously identifying the used DRS and finding the timing using the SSBI. A RMSI/OSI Paging association and multiplexing pattern 1 (TDM) may be pre-defined for each of the configurations to be used.

An SSB-Burst may be moved instead of individual DRS/SSB. SS-Bursts (SSB-Groups) may be shifted to different SSB-Burst locations when LBT fails for at the beginning of SSB Burst. Multiple occasions may be defined for groups of SSB/SSB-Bursts, instead of individual SSB. In conventional NR systems, there may be 142.86 µs gap between two SS-Bursts (SSB-Groups) in case of 30 kHz SCS. There may be a 71.43 µs gap in a 120 kHz SCS case and similar may be possible for a 60 kHz SCS case. Accordingly, there may be a gap in transmission between two different groups. Category 2 LBT may be performed at those gaps. Another device may start transmission and LBT may fail. In this case, the rest of the SS-Bursts may be time shifted or cyclically shifted.

Figure 31:
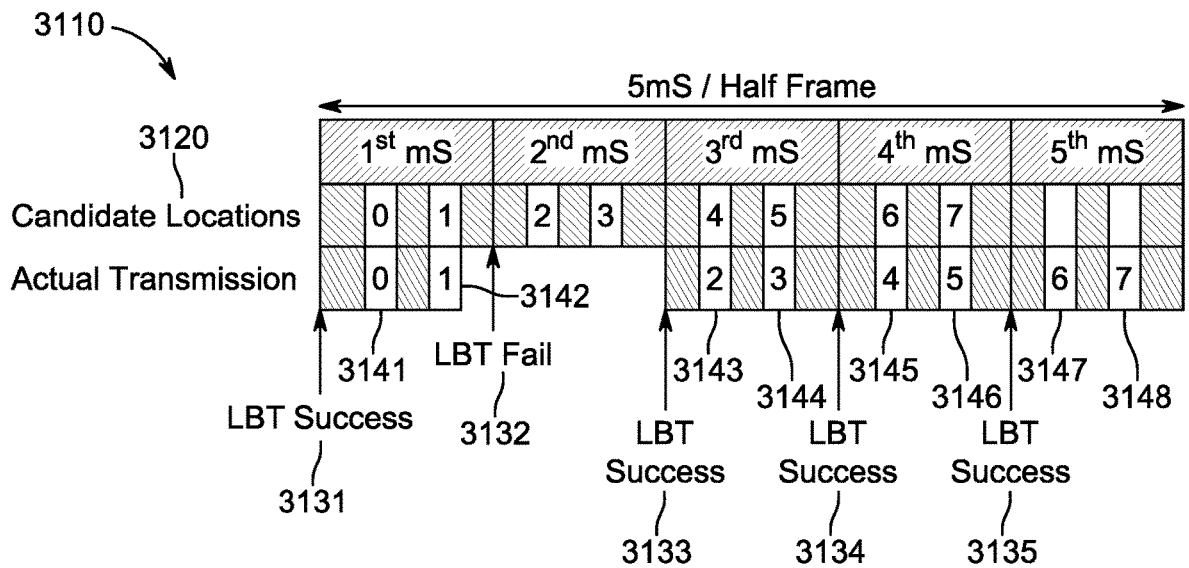
FIG. 31 shows shifting SSB Groups after LBT.

FIG. 31 is a diagram illustrating shifting SSB-Groups after LBT. As shown in FIG. 31 using 15 kHz SCS, [{0,1}, {2,3}, {4,5}, {6,7}] may need to be transmitted in 5 ms half frame 3110. Candidate locations 3120 may be available during the 5 ms half frame 3110 and an LBT success 3131 may result in an actual transmission of SSB0 3141 and SSB1 3142. There may be a gap between SSB1 3142 and SSB2 3143 as LBT 3131 may fail at the $2^{nd}$ slot of candidate locations 3120. LBT 3133 may succeed at the $3^{rd}$ slot of candidate locations 3120 and, thus, the transmission may get shifted such that SSB2 3143 is transmitted at the $4^{th}$ slot, SSB3 3144 is transmitted at the $5^{th}$ slot, SSB4 3145 is transmitted at the $6^{th}$ slot, SSB5 3146 is transmitted at the $5^{th}$ slot, and SSB6 3147 and SSB7 3148 are transmitted thereafter.

Figure 32:
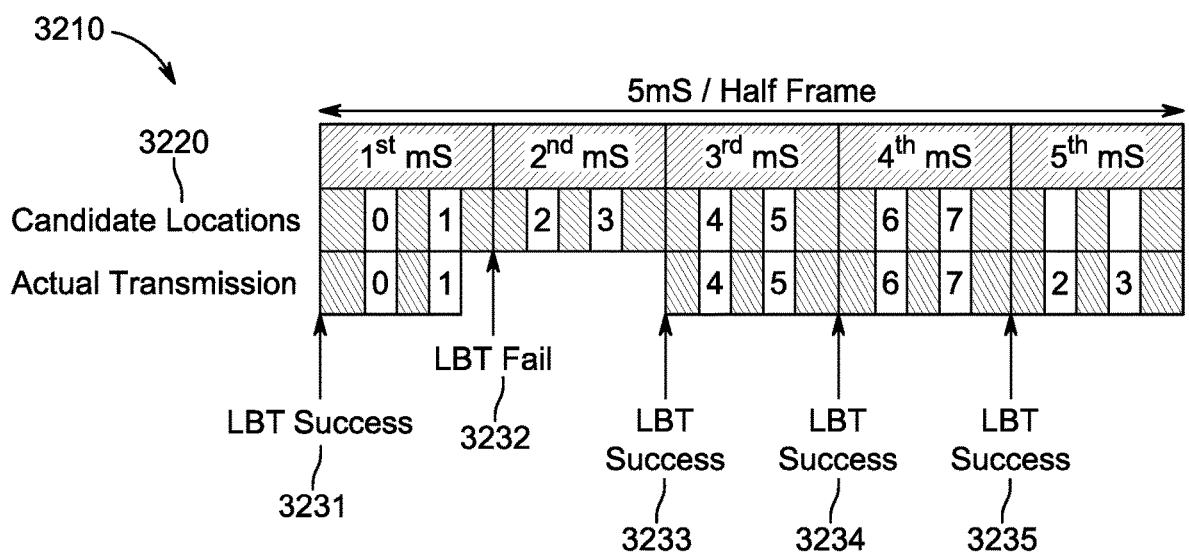
FIG. 32 shows cyclically Shifting SSB-Groups after LBT.

FIG. 32 is a diagram illustrating cyclically shifting SSB-Groups after LBT. An SS-Burst with SSBI {0,1} may be transmitted at candidate locations 0 and 1, of the candidate locations 3220, after a successful LBT 3231. An LBT 3232 may fail prior to candidate location 2. A cyclic shift may occur where the SS-Burst (with SSBI {4,5} and {6,7}) are transmitted at their original candidate location (with no offset indicated), after successful LBTs 3233 and 3234, and the SS-Burst with SSBI {2,3} are transmitted in the 5th slot after successful LBT 3235. The example shown in FIG. 32 uses 15 kHz SCS, but the general principle may be applied in all configurations.

Figure 33:
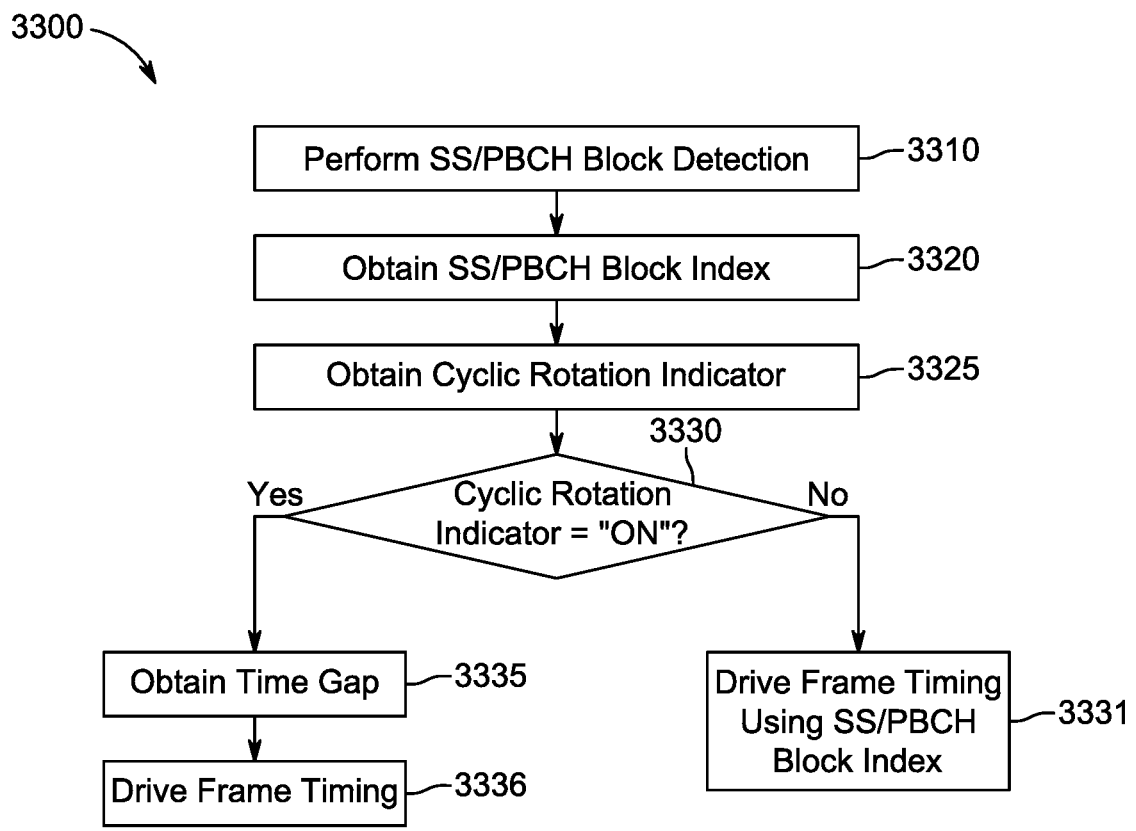
FIG. 33 shows a flowchart for determining frame timing.

As shown in the flowchart 3300 of FIG. 33, a WTRU may perform SS/PBCH block detection at 3310 and may obtain a SS/PBCH block index at 3320. The WTRU may obtain the SS/PBCH block index from DMRS and/or PBCH payload, as disclosed herein. The WTRU may obtain a cyclic rotation indicator at 3325. The cyclic rotation indicator may be provided via SS (e.g., PSS/SSS), via DMRS, and/or via a PBCH payload.

At 3330, a determination may be made regarding whether the cyclic rotation indicator is in an ON or OFF state. It will be understood that an ON or OFF state may be represented in any applicable manner including a boolean bit or the like. If, at 3330, it is determined that the cyclic rotation indicator is in an OFF state then, at 3331, the WTRU derives frame timing using the SS/PBCH block index. If, at 3330, it is determined that the cyclic rotation indicator is in an ON state then, at 3335, the WTRU obtains a time gap. The time gap may correspond to the delay in time between a first unsuccessful LBT and a second successful LBT or the delay in time between a first unsuccessful LBT and a transmission after a second successful LBT. The time gap may be carried or indicated in a SS block. For example, the time gap may be carried or indicated in PBCH payload and/or carried or indicated by DMRS. Further, if the cyclic rotation indicator is in an ON state then, at 3336, the WTRU derives the frame timing. At 3336, the frame timing is determined based on the cyclic rotation indicator, the SS/PBCH block index, and the time gap obtained at 3335.

Figure 34A:
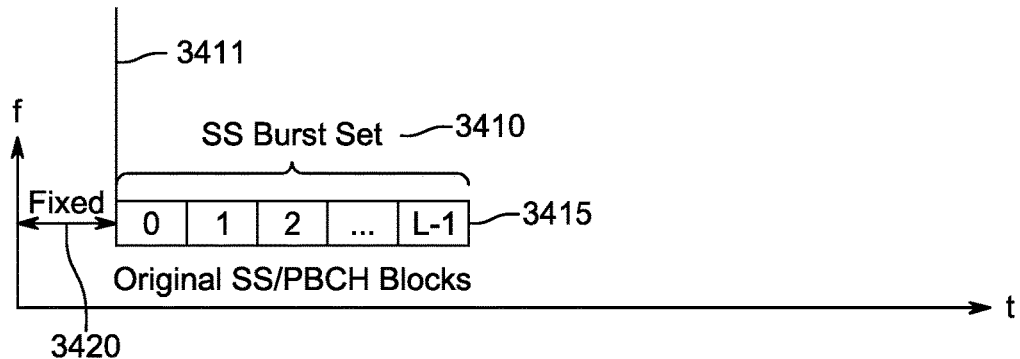
FIG. 34A shows an SSB after a successful LBT.

FIG. 34A shows a SS burst set 3410 that includes original SS/PBCH blocks and that is transmitted in a regular time location and where a cyclic rotation indicator indicates an off state. As shown, a fixed time duration 3420 elapses prior to a successful passed LBT 3411.

Figure 34B:
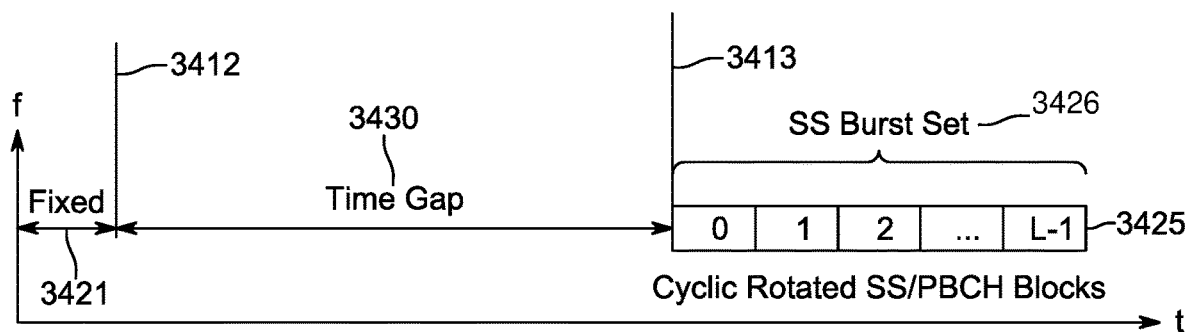

FIG. 34B shows a SS burst set 3426 that includes cyclically rotated SS/PBCH blocks 3425. The cyclically rotated SS/PBCH blocks 3425 are transmitted after a fixed time duration 3421 that elapses prior to a failed LBT 3412, a time gap 3430 of time that elapses between the failed LBT 3412 and a successful LBT 3413. The time gap may be carried or indicated in a SS block. For example, the time gap may be carried or indicated in PBCH payload and/or carried or indicated by DMRS. A cyclic rotation indicator may be in an on state to implement the configuration shown in FIG. 34B. The cyclic rotation on delayed blocks may be used as an original SS burst set (not shown) may not be passed due to, for example, channel unavailability.

NR-U SS/PBCH block or DRS and RMSI CORESET may be multiplexed using TDM. Due to uncertainty and LBT failure, RMSI may not be always transmitted at associated location. The WTRU may monitor PDCCH in RMSI CORESET over X consecutive slots starting from associated location (slot no). For SS/PBCH block with index i, the WTRU may determine an index of slot no as:

$$n_0 = (O \cdot 2^{\mu} + \lfloor i \cdot M \rfloor) \bmod N_{slot}^{frame,\mu}. \qquad \text{Equation 1}$$

The SFN may be computed depending on the following equation being odd or even.

$$\lfloor (O \cdot 2^{\mu} + \lfloor i \cdot M \rfloor)/N_{slot}^{frame,\mu} \rfloor. \qquad \text{Equation 2}$$

The vales for M, O, slot number, and X may be provided by tables which may be known and/or preconfigured in the gNB and WTRU. The value for µ may be based on the subcarrier spacing for PDCCH. For small values of M and O, the SSB and associated RMSI may be transmitted in the same slot and hence in the same COT. In this case, the value of X may be 1, which may imply that the WTRU monitors only one CORESET for RMSI. However, in existing NR, many associated RMSI locations go beyond 1 Radio Frame 10 ms. (e.g., high values of M, O). As the COT may not be long enough to cover the SSB and RMSI together, this may force disjoint transmission of SSB/RMSI. This disjoint of the SSB and RMSI may not be desirable as multiple LBT may increase uncertainty and delay or increase in latency. For longer offset and LBT failure, the WTRU may have to monitor for RMSI for multiple slots (X, defined earlier).

Various options for the value of X are possible. The value of X may depend on M and O. The value of X may be predefined and known to the WTRU and gNB. The value of X may be dynamic and configured in the WTRU by gNB. This may be determined by the load.

A conventional multiplexing pattern 1 table may be modified or reduced specifically for NR-U to include only values for of M and O that may be included in in a single COT given an SCS configuration.

In multiplexing mode 1 (TDM), RMSI locations may be computed with some precomputed location in the radio frame. Due to LBT failure, DRS may shift. However, in the case where LBT is performed for individual SS-Bursts instead of entire SS-Burst-Set, there may be cases where the shifted DRS and RMSI associated with SSBs transmitted before may collide with the following SS-Burst and/or RMSI which may not have been shifted because of LBT success. The CORESET may be rate-matched around the SSB. The following SS-Burst also may be shifted in time immediately following the end of the previous SS-Burst.

When SSBs dropped due to LBT failure are cyclically wrapped around to the end of the burst set transmission, this problem may be more prominent. RMSI locations in some of the multiplexing cases may collide with some of the wrapped SSBs. The SSBs received at a correct location may expect that RMSI is also going to be at a correct location. However wrapped SSBs may need to be transmitted at the RMSI location associated with of previous If RMSI associated with SSB 3 is transmitted in slot 9, there may be collision if a wrapped SSB is scheduled to be transmitted in slot 9.

If there is a collision, the CORESET may be rate-matched around the SSB. The WTRU may use configurations, such that RMSI is transmitted in the same slot as SSBs. In a more flexible case, the minimum N/2-slot time offset may be used from existing transmitted SSBs to make sure any of the N-SSB scheduled will be able to fit on those N/2 slots, as 2 SSBs may be scheduled in 1 slot.

In 60 kHz SCS, there may be 24 usable PRBs for 20 MHz, as the usable bandwidth is only 17.5 MHz approximately. In the 24 PRBs, 20 PRBs (8 symbols) may be used for 2 SSBs in each slot that includes SSB. Bandwidth for pattern 2/3 may not be not available if SCS 60 kHz is used. Moreover, after 2 SSB, only 6 symbols and 4 PRB may be available for RMSI CORESET data, which may not be sufficient for RMSI being transmitted in same slot. Pattern 1 with cross slot scheduling of the RMSI CORESET may be required. This may force the gNB to use higher values of M and O. This may increase the duration of SS Burst to longer than 1 mS. This may force Category 4 LBT to be used instead of Category 2 LBT. However, pattern 2/3 for multiplexing SSBs and RMSI may be used with SCS 30 kHz SCS of RMSI and SSB.

An initial signal may be defined as a signal that facilitates its detection with low complexity and may be transmitted at the beginning of a transmission burst. This signal may facilitate spatial re-use, WTRU power saving, an extended support to DRX mode, and paging. It may aid in serving cell transmission burst acquisition. For example, the initial signal may indicate the COT duration indication for SSB. The initial signal may also aid efficient NRU coexistence mechanisms, at least for same-operator cells.

An initial signal may support one or more of following different types of indications. The initial signal may support indication of COT (broadcast). The initial signal may indicate duration of the frame. Alternatively, it may indicate that in the payload for the initial signal that a duration of COT is present.

An initial signal may support RTS/CTS exchange (groupcast/unicast). The initial signal may aid in the process of RTS/CTS type closed loop channel access mechanism or receiver assisted transmission, where gNB sends a message to a WTRU or group of WTRUs to make sure there are no hidden node transmission in progress. This may include receiver assisted transmission.

An initial signal may support paging indication (groupcast). The initial signal may indicate that there is a page for a group of WTRUs and a WTRU may come out of the DRX cycle to check the corresponding paging occasion.

An initial signal may support system information RMSI/OSI indication (groupcast/broadcast/unicast). The initial signal may indicate change of SI or similar for a WTRU, a group of WTRUs, or all WTRUs.

An initial signal may support PDCCH indication (unicast). The initial signal may indicate that there is a PDCCH is being transmitted. This may be seen as fast-paging, or power saving in active mode.

An initial signal may support wake up and go to sleep (unicast/groupcast). The initial signal may aid deeper sleep and/or aid and enhance the DRX cycle. The initial signal also may be used as an AGC signal.

Various designs may be considered for this initial signal. As an example, the initial signal may be a signal or sequence like PSS of NR/LTE or L-STF for WLAN. The initial signal may be considered as a base sequence and generated using one or more of a: M or PN Sequence, ZC sequence, any sequence with good correlation properties, and a CG sequence.

The base sequence used to transmit this indication may be function of a Cell-ID, which may aid in frequency reuse. The sequence may be used in frequency domain and mapped to frequency resources. As the initial signal may be used for different functions, it may have multiple states which may indicate the function of Initial signal. For a unified design, different functions or different formats of the wakeup signal may be indicated using 3 bits or 8 different states of the initial signal. These may be same or different than the above mentioned different types of indication.

The indications or states may be indicated using various methods including one or more of the following: cyclic shifts of the sequence, different initialization of PN sequence, different circular shifts of the sequence, different frequency locations or resources, split between two different methods. As an example, an initial signal of COT/RTS/CTS may always be transmitted at beginning of a frame. Paging may be transmitted at other WTRU or group specific locations.

An existing PSS sequence or SSS sequence may be modified by orthogonal cover codes and cyclic shifts may be used to indicate different functions of the initial signal. These may be transmitted before or after the SS/PBCH block.

Figure 35:
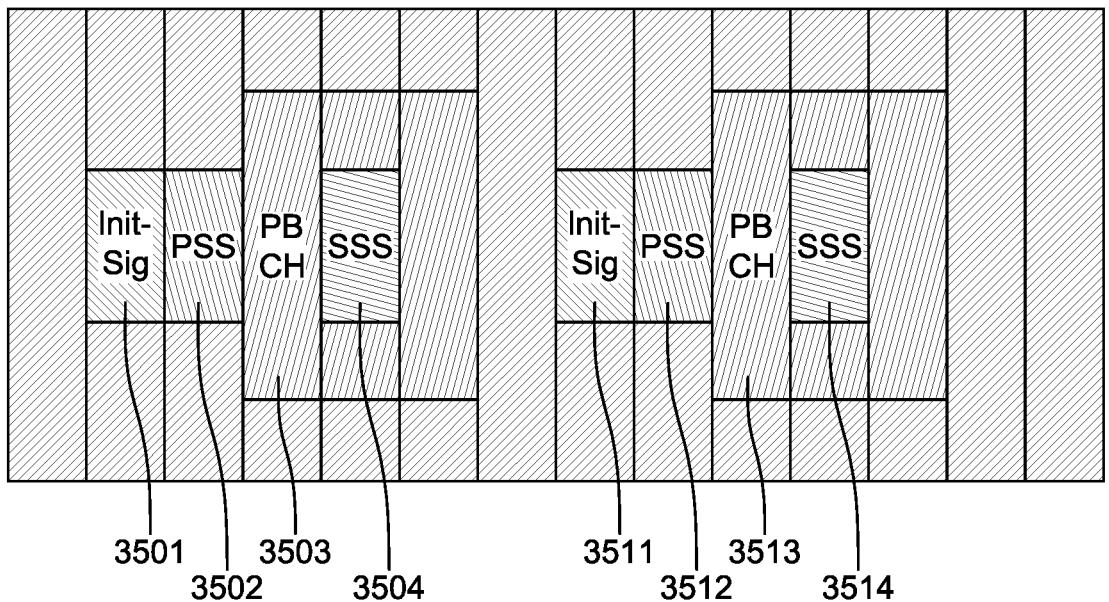
FIG. 35 shows an initial signal transmitted before an SS/PBCH Block.

As shown in FIG. 35, this may assist in randomization and coherent detection of the initial signal. FIG. 35 is a diagram illustrating an initial signal 3501 or 3511 transmitted before an SSS 3504 or 3515 and/or PBCH 3503 or 3513 block and/or a PSS 3502 or 3512 block. The initial signal 3501 or 3511 may also be two step combination of indicator signal followed by a payload at predefined or configured or indicated location. In this case, the indicator signal may be similar to the initial signal described above. The indicator signal may indicate the existence and/or type of payload and potentially location of payload. This may be used in low-power scenario where a WTRU is only monitoring this initial signal at specific resource/frequency-band. Considering the state of the indicator signal, the WTRU may decide to decode the payload and then decide to wake up. The initial signal 3501 or 3511 may have a different SCS as compared to a payload. The indicator signal may also be interlaced in time or frequency with the payload and may aid the estimation of channel for coherent detection of the payload.

An initial signal may be payload transmitted along with SS/PBCH Block or DRS with same or different periodicity. This may be coded with very simple linear codes, which may be decoded with low complexity.

An initial signal may occupy same resources (e.g., time/frequency location) for all the users for broadcast purposes. In a simplest case, it may occupy the first OFDM symbol of the slot. In case of groupcast functions, it may occupy resources (e.g., time/frequency location) that may be common to a group and which may be configured to the group. It may be also configured to individual users.

Configurations for these resources may be done using RMSI/OSI or RRC signaling. There may be multiple initial signals transmitted simultaneously at different resources in the same frame with different purposes. A WTRU may be required to monitor all of those resources for individual, group, and broadcast transmissions. The initial signal may or may not be associated with SSB. In the time domain, the initial signal may be transmitted at the start of a DL transmission burst. It may be transmitted before SSBs and/or before CORESET in a slot/mini-slot. The initial signal may be part of CORESET (e.g., first symbol of the multi symbol CORESET). The location also may depend on the type or function of indication.

An initial signal may be used in RTS/CTS like operations. A gNB may send a CTS like initial signal in DL symbol and may wait for a receiver response in the same slot and in the same COT. This also may be in form of an initial signal. For the uplink response, the WTRU may be configured or indicated (implicitly or explicitly) with a resource or location or frequency band, where it may transmit an initial signal.

A beam for an initial signal may depend on the recipient for the data. If the transmission is groupcast or broadcast, an initial signal may be transmitted in all beams along with the data. If the transmission is unicast, the gNB may send an initial signal for the WTRU in the last known beam for certain threshold period and for all beams after the threshold period.

A wake up signal (WUS) design may be included in the TX-preamble or unified initial signal. A WUS for paging may be function as paging indicator. This may be the same base initial signal with using cyclic shift or other modification as described above. The WUS may be transmitted at specific location known to the WTRU. The WUS may be in the same RBs as the SS/PBCH blocks in the first OFDM symbol or OFDM symbols before each SS/PBCH block. The WUS may indicate the presence of a page (for group of users) without monitoring the PDCCH with P-RNTI. This may reduce complexity of blind decoding. The WTRU may take some time to come out of deep sleep and turn on the functionality for monitoring the PDCCH. The paging initial signal with paging indicator may be transmitted with some offset (e.g., 10 ms).

However, the wake up time may be too long for COT. There may be another LBT performed by the gNB to transmit the PDCCH. Accordingly, a fixed configurable delay may be used. After this configured delay, the WTRU may expect the paging occasion window (POW) to start. The WTRU may expect PDCCH with P-RNTI anywhere within this window duration.

The delay between the paging indicator or WUS and POW may be different for different users. The delay may depend on one or more of WTRU capability, load of the system, actually transmitted/used beams in the system, and it may be configured in the WTRU using RMSI/RRC signaling.

If a WTRU sees a paging indicator for its own group, the WTRU may start monitoring after a configured time and may monitor PDCCH with P-RNTI within the POW. The WTRU may continue to monitor X number of slots (which may be considered as pageless-slots-to-monitor). The value of X may be configured in the WTRU using RMSI/RRC signaling. If not configured, the WTRU may monitor entire POW for PDCCH.

The QCL between a paging indicator (WUS/initial signal) and paging PDCCH may not hold if a long duration has passed. A timer and threshold may be used check if QCL assumptions are still valid.

The WUS as a special case of initial signal may be associated to a sub-group of WTRUs. Similar to an initial signal, various WUS resources (e.g., time, frequency, sequence, and code) may be used for different groups of WTRUs associated with different POs. The number of WUS resources for all the WTRUs associated with a PO may be configurable depending on one or more of the system overhead or load, the level of coverage enhancement (e.g., repetition factor or aggregation level), and the number of POs in a frame. If the group is based on a repetition level, the RB allocated for WUS and the sequence used for WUS may be larger for that group and may be configured. The number of sub-groups may be configurable by RMSI or RRC signaling.

The WTRU may be able to identify its group using its WTRU_ID or there may be a specific assignment or RRC configuration for the WUS Group ID. The number of WTRU groups may be fixed or configured by RRC/RMSI signaling. In some scenarios, WTRU grouping may need to be disabled. This may be done by RMSI signaling, where a bit may be used to enable or disable the WUS grouping. A WTRU may be transmitted the group WUS in the initial active BWP. The gNB may consider the initial active BWP while considering the grouping.

The NR PSS sequence or NR-SSS sequence may be modified using orthogonal cover codes or cyclic shifts may be used to indicate different groups for WUS. The WUS may be transmitted before or after the SS/PBCH block. This may achieve randomization across multiple cells and enable coherent detection if the initial signal. This WUS design is illustrated in FIG. 36.

Figure 36:
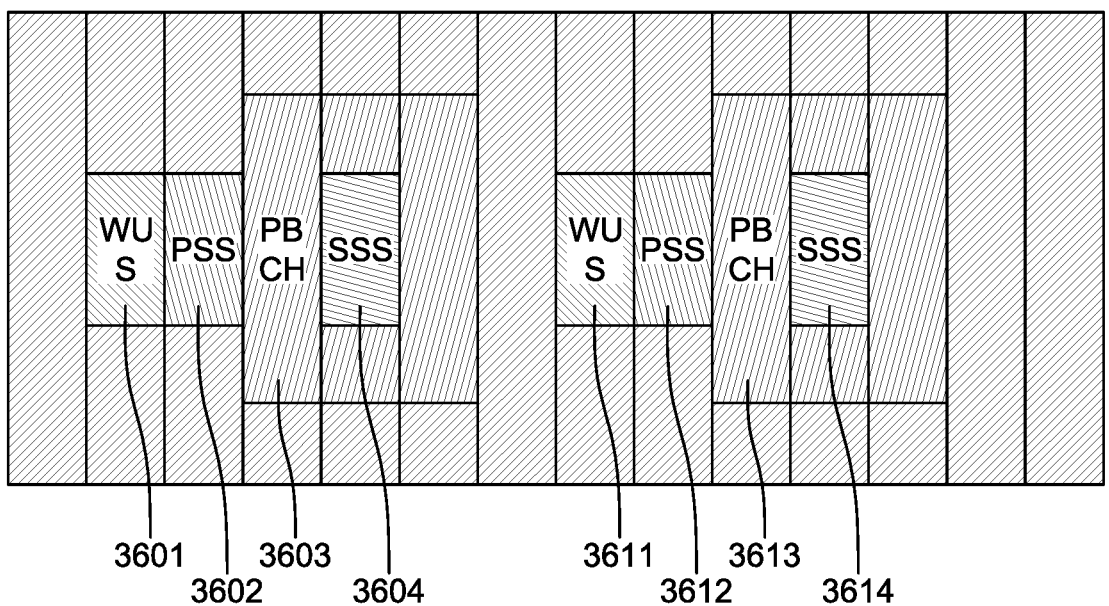
FIG. 36 shows a wake up signal (WUS) for a group transmitted before an SS/PBCH Block.

FIG. 36 is a diagram illustrating a WUS 3601 or 3611 for a group transmitted before an SSS 3604 or 3614, PSS 3602 or 3612, and/or PBCH 3503 or 3613 Block. A WTRU may receive the PSS 3602 or 3612 in its predefined beam in the DRS within the DMRC and may check the WUS 3601 or 3611 signal. If the WUS 3601 or 3611 signal is found, it may see if it corresponds to its group. If the WUS 3601 or 3611 signal corresponds to its group, the WTRU may monitor it's PDCCH in location starting from computed location for the duration of paging occasion widow. The computed location may be same as the current slot, or in other words, it may have a zero offset. In this case, paging may be FDMed or TDMed in same slot with DRS and WUS. The paging occasion window also may be considered as zero.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising:
a receiver configured to receive a Synchronization Signal/Physical Broadcast Channel (SS/PBCH) block transmission, comprising a plurality of SS/PBCH blocks, wherein each of the plurality of SS/PBCH blocks has a block index;
a transceiver; and
a processor
wherein the transceiver and processor are configured to:
detect a first SS/PBCH block index;
determine a frame timing based on the first SS/PBCH block index;
determine a second SS/PBCH block index from the detected first SS/PBCH block index; and
perform an initial access to a cell based on the second SS/PBCH block index;
wherein the second SS/PBCH block index is the first SS/PBCH block index modulo N, wherein N is based on a transmission occasion in which a network acquired access to an unlicensed spectrum;
wherein N is signaled in a PBCH associated with the detected first SS/PBCH block index and indicates the number of SS/PBCH blocks cyclically shifted;
wherein the SS/PBCH blocks are cyclically shifted due to a failure of one or more listen before talk procedures.

2. The WTRU of claim 1, wherein the first SS/PBCH block index further comprises at least one of a Primary Synchronization Signal (PSS) or a Secondary Synchronization Signal (SSS).

3. The WTRU of claim 1, wherein the second SS/PBCH block index further comprises at least one of a PSS or a SSS.

4. The WTRU of claim 1, wherein the second SS/PBCH block index is an effective second SS/PBCH block index.

5. The WTRU of claim 1, wherein the processor is further configured to determine a slot and symbol in a frame based on the first SS/PBCH block index.

6. The WTRU of claim 1, wherein N is one of a three-bit indication or four-bit indication.

7. The WTRU of claim 1, wherein the transceiver and process are further comprising:
receiving a second SS/PBCH block transmission; and
based on the second SS/PBCH block transmission, determining a second N;
wherein the second N is different than the N associated with the detected SS/PBCH block index.

8. A method performed by a wireless transmit/receive unit (WTRU), the method comprising:
receiving a Synchronization Signal/Physical Broadcast Channel (SS/PBCH) block transmission, comprising a plurality of SS/PBCH blocks, wherein each of the plurality of SS/PBCH blocks has a block index;
detecting a first SS/PBCH block index;
determining a frame timing based on the first SS/PBCH block index;
determining a second SS/PBCH block index from the detected first SS/PBCH block index; and
performing an initial access to a cell based on the second SS/PBCH block index;
wherein the second SS/PBCH block index is the first SS/PBCH block index modulo N, wherein N is based on a transmission occasion in which a network acquired access to an unlicensed spectrum;
wherein N is signaled in a PBCH associated with the first detected SS/PBCH block index and indicates the number of SS/PBCH blocks cyclically shifted;
wherein the SS/PBCH blocks are cyclically shifted due to a failure of one or more listen before talk procedures.

9. The method of claim 8, wherein the first SS/PBCH block index further comprises at least one of a Primary Synchronization Signal (PSS) or a Secondary Synchronization Signal (SSS).

10. The method of claim 8, wherein the second SS/PBCH block index further comprises at least one of a PSS or SSS.

11. The method of claim 8, wherein the second SS/PBCH block index is an effective second SS/PBCH block index.

12. The method of claim 8, further comprising determining a slot and symbol in a frame based on the first SS/PBCH block index.

13. The method of claim 8, wherein N is one of a three-bit indication or four-bit indication.

14. The method of claim 8, further comprising:
receiving a second SS/PBCH block transmission; and
based on the second SS/PBCH block transmission, determining a second N;
wherein the second N is different than the N associated with the detected SS/PBCH block index.

* * * * *